US008993061B2

(12) United States Patent
Jones et al.

(10) Patent No.: US 8,993,061 B2
(45) Date of Patent: *Mar. 31, 2015

(54) DIRECT PRINTING TO FABRIC

(75) Inventors: David P. Jones, Beaverton, OR (US);
Ryan R. Larson, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 81 days.

This patent is subject to a terminal disclaimer.

(21) Appl. No.: 13/553,348

(22) Filed: Jul. 19, 2012

(65) Prior Publication Data

US 2014/0020191 A1  Jan. 23, 2014

(51) Int. Cl.
| | |
|---|---|
| *B05D 5/00* | (2006.01) |
| *A43B 1/04* | (2006.01) |
| *A43B 3/00* | (2006.01) |
| *A43B 23/02* | (2006.01) |
| *A43D 11/00* | (2006.01) |
| *B29C 67/00* | (2006.01) |
| *B29C 70/78* | (2006.01) |
| *B29L 31/50* | (2006.01) |

(52) U.S. Cl.
CPC ............ *A43B 3/0084* (2013.01); *A43B 1/04* (2013.01); *A43B 23/0235* (2013.01); *A43B 23/026* (2013.01); *A43D 11/00* (2013.01); *B29C 67/0055* (2013.01); *B29C 70/78* (2013.01); *B29K 2713/00* (2013.01); *B29L 2031/50* (2013.01)
USPC ...... 427/288; 427/389.9; 12/142 R; 12/146 C

(58) Field of Classification Search
None
See application file for complete search history.

(56) References Cited

U.S. PATENT DOCUMENTS

| | | | |
|---|---|---|---|
| 2,647,337 A | | 8/1953 | Martin |
| 3,554,834 A | | 1/1971 | Bennett et al. |
| 4,078,962 A | | 3/1978 | Krueger |
| 4,314,814 A | | 2/1982 | Deroode |
| 4,888,713 A | | 12/1989 | Falk |
| 4,899,411 A | | 2/1990 | Johnson et al. |
| 5,121,329 A | * | 6/1992 | Crump .......................... 700/119 |
| 5,255,352 A | | 10/1993 | Falk |
| 5,308,426 A | | 5/1994 | Claveau |

(Continued)

FOREIGN PATENT DOCUMENTS

| | | |
|---|---|---|
| EP | 1000731 | 5/2000 |
| EP | 2189272 A2 | 5/2010 |

(Continued)

OTHER PUBLICATIONS

"Thermoplastic Polyurethane (TPU) Plastic"; retrieved from http://plastics.ides.com/generics/54/thermoplastic-polyurethane-tpu on May 22, 2014.*

(Continued)

*Primary Examiner* — Timothy Meeks
*Assistant Examiner* — Michael P Rodriguez
(74) *Attorney, Agent, or Firm* — Plumsea Law Group, LLC

(57) ABSTRACT

Methods and systems are disclosed for three-dimensional printing directly onto an article of apparel. Disclosed is a method and system for direct three-dimensional printing onto an article of apparel, including designing a three-dimensional pattern for printing onto the article, positioning at least a portion of the article on a tray in a three-dimensional printing system, the portion being positioned substantially flat on the tray, printing a three-dimensional material directly onto the article using the designed pattern, curing the printed material, and removing the article from the three-dimensional printing system.

42 Claims, 22 Drawing Sheets

(56) References Cited

U.S. PATENT DOCUMENTS

| | | | |
|---|---|---|---|
| 5,340,433 A * | 8/1994 | Crump | 156/578 |
| 5,709,954 A | 1/1998 | Lyden et al. | |
| 5,798,017 A | 8/1998 | Claveau | |
| 5,832,819 A | 11/1998 | Widman | |
| 5,893,964 A | 4/1999 | Claveau | |
| 6,299,817 B1 | 10/2001 | Parkinson | |
| 6,544,634 B1 | 4/2003 | Abrams et al. | |
| 6,641,893 B1 * | 11/2003 | Suresh et al. | 428/105 |
| 6,718,880 B2 | 4/2004 | Oshima et al. | |
| 6,743,109 B2 | 6/2004 | Kammerer, Jr. et al. | |
| 6,814,831 B2 | 11/2004 | Drake | |
| 6,984,281 B2 | 1/2006 | Oshima et al. | |
| 6,994,765 B2 | 2/2006 | Oshima et al. | |
| 6,998,005 B2 | 2/2006 | Magee et al. | |
| 7,077,926 B2 | 7/2006 | Goffi et al. | |
| 7,137,426 B2 | 11/2006 | Neri et al. | |
| 7,166,249 B2 | 1/2007 | Abrams et al. | |
| 7,267,737 B2 | 9/2007 | Neri et al. | |
| 7,322,131 B2 | 1/2008 | Yamashita et al. | |
| 7,393,811 B2 | 7/2008 | Chervin | |
| 7,563,341 B2 | 7/2009 | Ferguson et al. | |
| 7,758,713 B2 | 7/2010 | Morlacchi | |
| 7,877,905 B2 | 2/2011 | Bensing et al. | |
| 7,945,343 B2 | 5/2011 | Jones et al. | |
| 7,950,432 B2 | 5/2011 | Langvin et al. | |
| 8,028,440 B2 | 10/2011 | Sokolowski et al. | |
| 2002/0032974 A1 * | 3/2002 | McCrindle | 36/130 |
| 2003/0115679 A1 | 6/2003 | Morlacchi et al. | |
| 2004/0103562 A1 | 6/2004 | Chaigne | |
| 2006/0024455 A1 | 2/2006 | Oshima et al. | |
| 2006/0054039 A1 * | 3/2006 | Kritchman et al. | 101/424.1 |
| 2007/0039682 A1 | 2/2007 | Drake et al. | |
| 2007/0079928 A1 | 4/2007 | Abrams et al. | |
| 2007/0098898 A1 * | 5/2007 | Wu | 427/256 |
| 2007/0130805 A1 | 6/2007 | Brady et al. | |
| 2008/0127426 A1 | 6/2008 | Morlacchi et al. | |
| 2008/0147219 A1 | 6/2008 | Jones | |
| 2009/0126225 A1 * | 5/2009 | Jarvis | 36/29 |
| 2010/0084083 A1 | 4/2010 | Hull et al. | |
| 2010/0095557 A1 | 4/2010 | Jarvis | |
| 2010/0122476 A1 | 5/2010 | Le et al. | |
| 2010/0326591 A1 | 12/2010 | Langvin et al. | |
| 2011/0192537 A1 | 8/2011 | Langvin et al. | |
| 2011/0277250 A1 | 11/2011 | Langvin et al. | |
| 2012/0055044 A1 * | 3/2012 | Dojan et al. | 36/87 |
| 2012/0105534 A1 | 5/2012 | Boday | |

FOREIGN PATENT DOCUMENTS

| | | |
|---|---|---|
| EP | 2594146 A1 | 5/2013 |
| WO | 9629208 | 9/1996 |
| WO | 02094581 | 11/2002 |
| WO | 2003/041875 A1 | 5/2004 |
| WO | 2004112525 | 12/2004 |

OTHER PUBLICATIONS

International Search Report and Written Opinion of PCT International Searching Authority for PCT/US2013/050879 (Feb. 18, 2014).
International Search Report and Written Opinion of PCT International Searching Authority for PCT/US2013/050884 (Feb. 18, 2014).

* cited by examiner

U S 8,993,061 B2

DIRECT PRINTING TO FABRIC

TECHNICAL FIELD

This disclosure relates generally to the field of three-dimensional ("3D") printing onto an article of apparel, footwear, or equipment, and more specifically to methods and systems for 3D printing directly onto fabric apparel materials.

BRIEF DESCRIPTION OF THE DRAWINGS

The accompanying drawings, which are incorporated in and constitute a part of this specification, illustrate embodiments and, together with the description, serve to explain the features, advantages, and principles of the embodiments disclosed throughout this disclosure. For illustration purposes, the following drawings may not be to scale. Moreover, like reference numerals designate corresponding parts throughout the different views. In the drawings.

DETAILED DESCRIPTION

Figure 1:
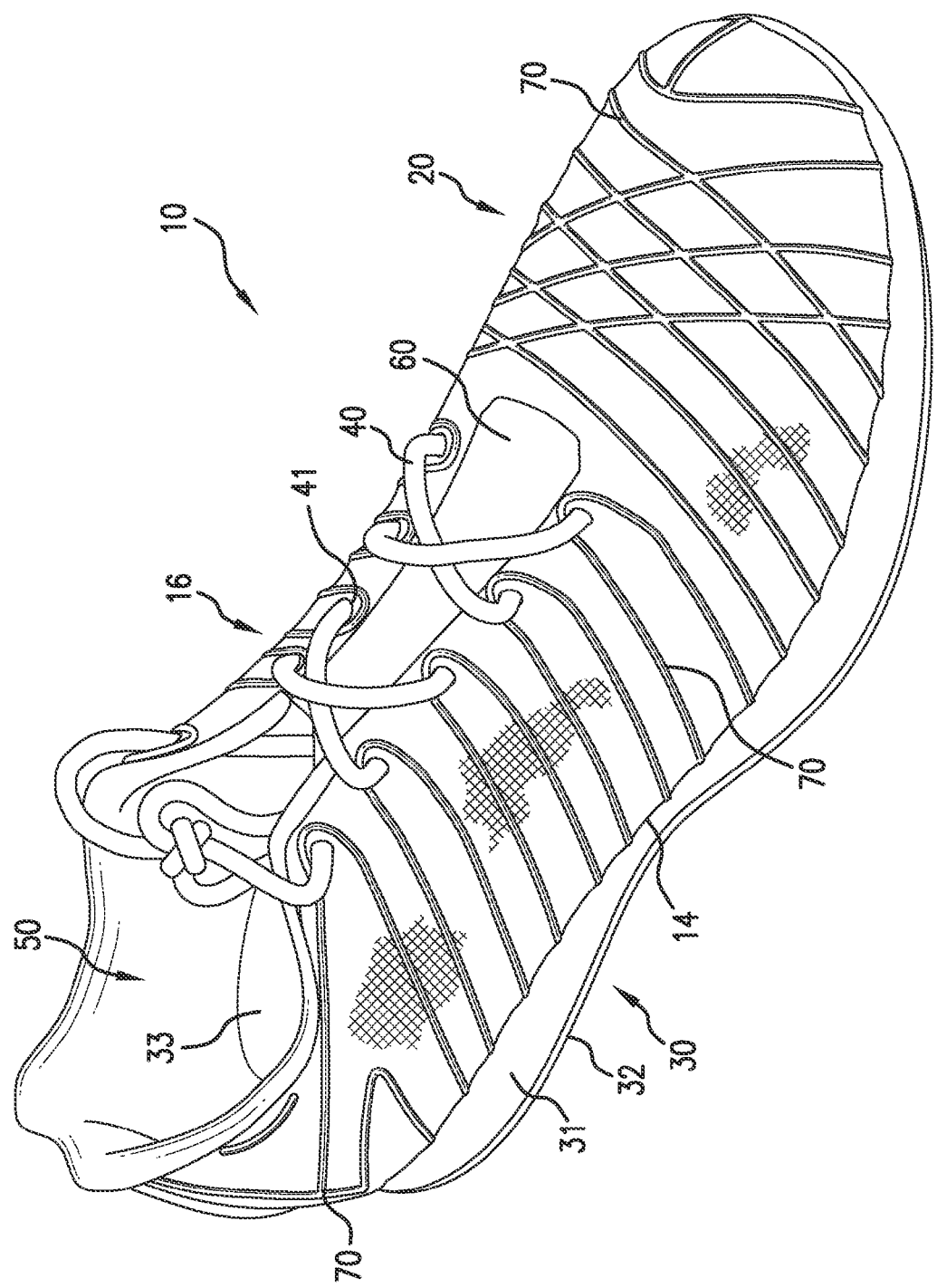
FIG. 1 shows an elevated view of an article of footwear consistent with an embodiment of the disclosure.

The following discussion and accompanying figures disclose methods and systems for 3D printing and assembly of an article of footwear having an upper that includes 3D printing directly onto the upper material. In particular, an exemplary method is disclosed for 3D printing directly onto a fabric material, which allows building of a structure on the fabric for use in apparel applications. The disclosed methods and systems may use any suitable 3D printing system.

As used throughout this disclosure, the terms "three-dimensional printing system," "three-dimensional printer," "3D printing system," and "3D printer" refer to any known 3D printing system or printer. Contrary to known 3D printing methods, however, the disclosed methods and systems accomplish 3D printing directly onto any surface of a textile, a natural fabric, a synthetic fabric, a knit, a woven material, a nonwoven material, a mesh, a leather, a synthetic leather, a polymer, a rubber, and a foam, or any combination of them, without the need for a release layer interposed between a substrate and the bottom of the printed material, and without the need for a perfectly or near-perfectly flat substrate surface on which to print. For example, the disclosed methods may include printing a resin, acrylic, or ink material onto a fabric, for example a knit material, where the material is adhered/bonded to the fabric and where the material does not generally delaminate when flexed, rolled, worked, or subject to additional assembly processes/steps. As used throughout this disclosure, the term "fabric" may be used to refer generally to materials chosen from any textile, natural fabric, synthetic fabric, knit, woven material, nonwoven material, mesh, leather, synthetic leather, polymers, rubbers, and foam. Also as used throughout this disclosure, the terms "printing" or "printed," and "depositing" or "deposited," are each used synonymously, and are intended to refer to the association of a material from a source of the material to a receiving surface or object.

Consistent with an embodiment, an exemplary article of footwear is disclosed as having a general configuration suitable for walking or running. As used throughout this disclosure, the terms "article of footwear" and "footwear" include any footwear and any materials associated with footwear, including an upper, and may also be applied to a variety of athletic footwear types, including baseball shoes, basketball shoes, cross-training shoes, cycling shoes, football shoes, tennis shoes, soccer shoes, and hiking boots, for example. As used throughout this disclosure, the terms "article of footwear" and "footwear" also include footwear types that are generally considered to be nonathletic, formal, or decorative, including dress shoes, loafers, sandals, slippers, boat shoes, and work boots. Disclosed embodiments apply, therefore, to any footwear type.

While the disclosed embodiments are described in the context of footwear, the disclosed embodiments may further be equally applied to any article of clothing, apparel, or equipment that includes 3D printing. For example, the disclosed embodiments may be applied hats, caps, shirts, jerseys, jackets, socks, shorts, pants, undergarments, athletic support garments, gloves, wrist/arm bands, sleeves, headbands, any knit material, any woven material, any nonwoven material, sports equipment, etc. Thus, as used throughout this disclosure, the term "article of apparel" may refer to any apparel or clothing, including any article of footwear, as well as hats, caps, shirts, jerseys, jackets, socks, shorts, pants, undergarments, athletic support garments, gloves, wrist/arm bands, sleeves, headbands, any knit material, any woven material, any nonwoven material, etc. As used throughout this disclosure, the terms "article of apparel," "apparel," "article of footwear," and "footwear" may also refer to a textile, a natural fabric, a synthetic fabric, a knit, a woven material, a nonwoven material, a mesh, a leather, a synthetic leather, a polymer, a rubber, and a foam. For example, materials used in footwear formation are disclosed in U.S. Pat. No. 5,709,954, which is incorporated by reference.

In accordance with the systems and methods described throughout this disclosure, there is provided a method of direct three-dimensional printing onto an article of apparel, comprising: designing a three-dimensional pattern for printing onto the article; positioning at least a portion of the article on a tray in a three dimensional printing system, the portion being positioned substantially flat on the tray; printing a three-dimensional material directly onto the article using the designed pattern; curing the printed material; and removing the article from the three-dimensional printing system.

In accordance with the systems and methods described throughout this disclosure, there is also provided a method of fabricating an article of footwear, comprising: designing a three-dimensional pattern for printing onto an upper; providing the pattern to a print server; positioning at least a portion of the upper on a tray in a three dimensional printing system, the portion being positioned substantially flat on the tray; aligning the portion of the upper on the tray with the pattern; printing a three-dimensional material directly onto the upper using the designed pattern on the print server and the three-dimensional printing system; curing the printed material; removing the upper from the three-dimensional printing system; and assembling the article of footwear using the printed upper and at least one footwear component chosen from a sock liner, a midsole, and an outsole.

In accordance with the systems and methods described throughout this disclosure, there is provided a method of fabricating an article of footwear, comprising: designing a three-dimensional pattern for printing onto an upper; providing the pattern to a print server; positioning at least a portion of the upper on a tray in a three dimensional printing system, the portion being positioned substantially flat on the tray; aligning the portion of the upper on the tray with the pattern; printing a first layer of three-dimensional material directly onto the upper using the designed pattern on the print server and the three-dimensional printing system; allowing the first layer of printed material to at least partially absorb into a surface of the upper; curing the first layer, wherein the cured first layer has a first modulus of elasticity; printing at least one additional layer of the material on the cured first layer; curing the at least one additional layer, wherein the cured at least one additional layer has a different modulus of elasticity than the first modulus; removing the upper from the three-dimensional printing system; and assembling the article of footwear using the printed upper and at least one footwear component chosen from a sock liner, a midsole, and an outsole.

In accordance with the systems and methods described throughout this disclosure, there is provided a method of fabricating an article of footwear, comprising: designing at least a first three-dimensional pattern and a second three dimensional pattern for printing onto an upper; providing the at least first and second three-dimensional patterns to a print server; positioning at least a first portion of the upper on a tray in a three dimensional printing system, the first portion being positioned substantially flat on the tray; aligning the first portion of the upper with the first pattern; printing at least one layer of a first three-dimensional material having a first material property directly onto the first portion of the upper using the designed first pattern; allowing the at least one layer of printed first three-dimensional material to at least partially absorb into a first portion of a surface of the upper; curing the at least one layer of printed first three-dimensional material; positioning at least a second portion of the upper on the tray, the second portion being positioned substantially flat on the tray; aligning the second portion of the upper with the second pattern; printing at least one layer of a second three-dimensional material having a second material property directly onto the second portion of the upper using the designed second pattern; allowing the at least one layer of printed second three-dimensional material to at least partially absorb into a second portion of the surface of the upper; curing the at least one layer of printed second three-dimensional material; removing the upper from the three-dimensional printing system; and assembling the article of footwear using the printed upper and at least one footwear component chosen from a sock liner, a midsole, and an outsole.

In accordance with the systems and methods described throughout this disclosure, there is provided a system for three-dimensional printing directly onto a fabric upper, comprising: a first nontransitory computer-readable medium encoded with a first computer program product loadable into a first memory of a first computer and including first software code portions for storing a three-dimensional pattern for printing directly onto the upper; a print server; a switching device; and a three-dimensional printer device, wherein the print server is in direct communication with the three dimensional printer device and the switching device, wherein the switching device is in direct communication with the three dimensional printer device and the print server, wherein the first nontransitory computer readable medium is in direct communication with the switch, wherein the print server comprises a second nontransitory computer-readable medium encoded with a second computer program product loadable into a second memory of a second computer and including second software code portions for instructing the three-dimensional printing device to print directly onto the upper through a sequence of printing steps; wherein the three dimensional printer device comprises a tray receiving the fabric upper, at least one printing head for printing onto the upper in the sequence, and at least one ultraviolet light for curing material printed onto the upper, and wherein the three dimensional printing system does not require a substantially flat surface for printing.

Additional features and advantages will be set forth in part in the description that follows, being apparent from the description or learned by practice of embodiments. Both the foregoing description and the following description are exemplary and explanatory, and are intended to provide further explanation of the embodiments as claimed.

An article of footwear generally includes two primary elements: an upper and a sole structure. The upper may be formed from a plurality of material elements (e.g., one or more layers of a textile, a natural fabric, a synthetic fabric, a knit, a woven material, a nonwoven material, a mesh, a leather, a synthetic leather, a polymer, a rubber, and a foam, etc.) stitched or adhesively bonded together to form a void on the interior of the footwear for comfortably and securely receiving a foot. More particularly, the upper forms a structure that extends over instep and toe areas of the foot, along medial and lateral sides of the foot, and around a heel area of the foot. The upper may also incorporate a lacing system to adjust fit of the footwear, as well as permitting entry and removal of the foot from the void within the upper. In addition, the upper may include a tongue that extends under the lacing system to enhance adjustability and comfort of the footwear, and the upper may incorporate a heel counter. For example, the upper may be a high tensile strength knit or mesh sockfit upper.

Various material elements forming the upper may impart different properties to different areas of the upper. For example, textile elements may provide breathability and may absorb moisture from the foot, foam layers may compress to impart comfort, and leather may impart durability and wear-resistance. Consistent with an embodiment, therefore, 3D printed materials disposed on the upper during assembly of an article of footwear may thus be used to customize the properties of the upper and hence article of footwear. As disclosed throughout this disclosure, for example, 3D printed materials may be disposed on the upper to impart customized material properties such as increased strength, rigidity, support, flexibility, abrasion resistance, or variations thereof, based on desired material properties for specific portions of the upper and the article of footwear as a whole.

A sole structure is secured to a lower portion of the upper so as to be positioned between the foot and the ground. In athletic footwear, for example, the sole structure includes a midsole and an outsole. The midsole may be formed from a polymer foam material that attenuates ground reaction forces (i.e., provides cushioning) during walking, running, and other ambulatory activities. The midsole may also include cushions, such as fluid-filled chambers, plates, moderators, or other elements that further attenuate forces, enhance stability, or influence the motions of the foot, for example. The outsole forms a ground-contacting element of the footwear and is usually fashioned from a durable and wear-resistant rubber material that includes texturing to impart traction. The sole structure may also include a sockliner positioned within the upper and proximal to a lower surface of the foot to enhance footwear comfort.

Figure 2:
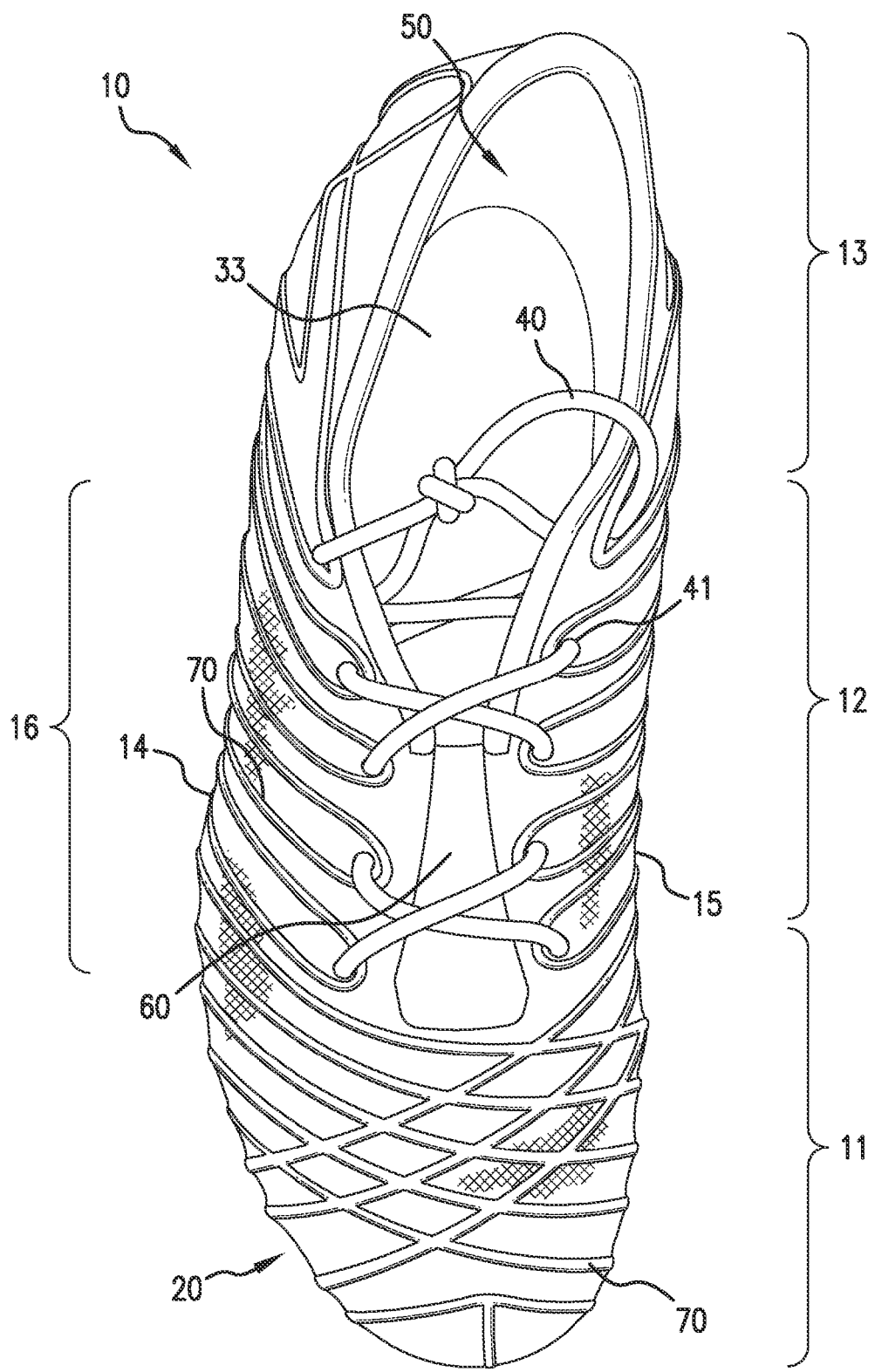
FIG. 2 shows an elevated view of a top portion of an article of footwear consistent with an embodiment of the disclosure.
Figure 3:
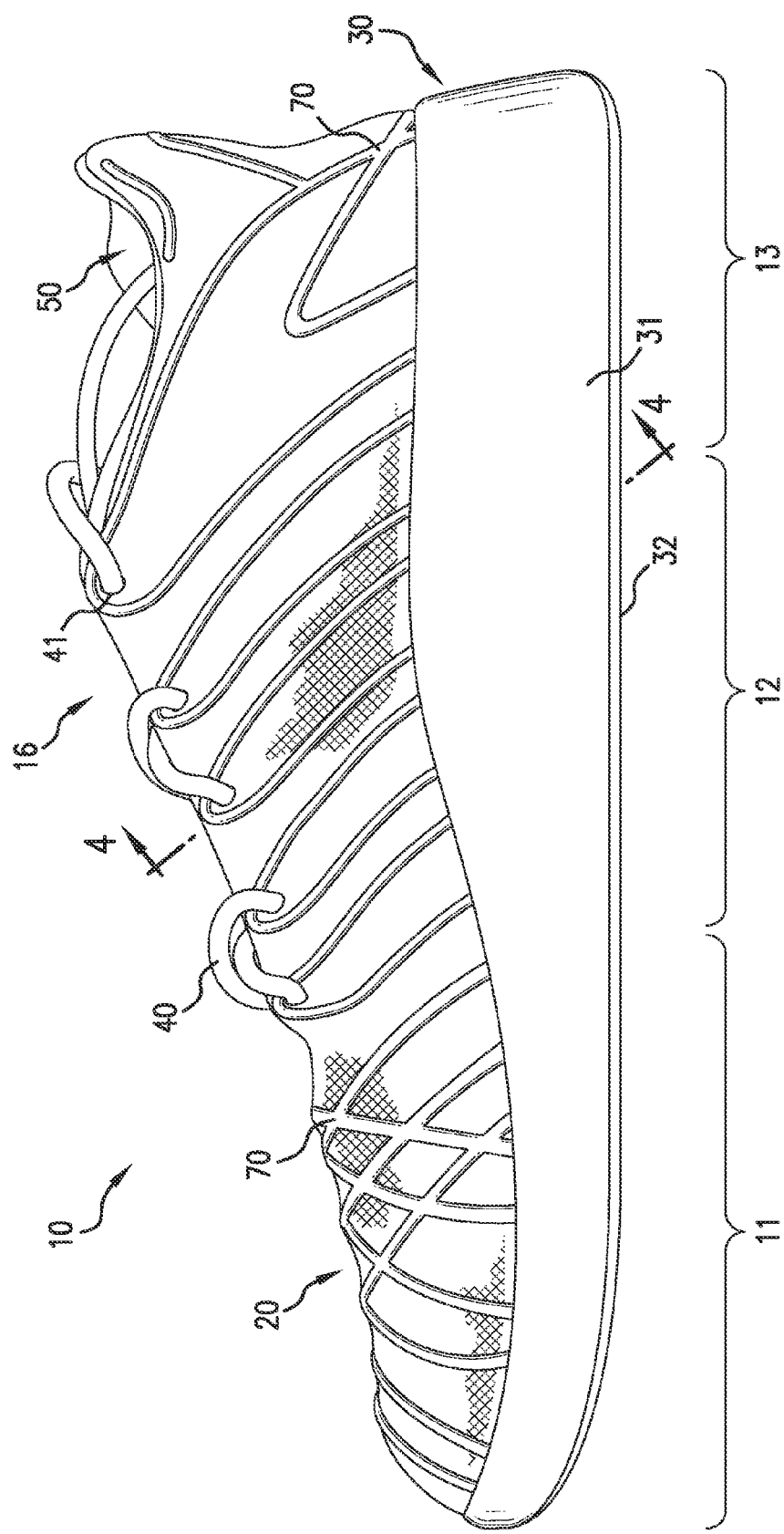
FIG. 3 shows an elevated view of a medial side of an article of footwear consistent with an embodiment of the disclosure.

Consistent with an embodiment, an article of footwear 10, throughout this disclosure referred to simply as footwear 10, is depicted in FIGS. 1-3 as including an upper 20 and a sole structure 30. For reference purposes, footwear 10 may be divided into three general regions: a forefoot region 11, a midfoot region 12, and a heel region 13. Footwear 10 also includes a lateral side 14 and a medial side 15. Forefoot region 11 generally includes portions of footwear 10 corresponding with the toes and the joints connecting the metatarsals with the phalanges. Midfoot region 12 generally includes portions of footwear 10 corresponding with the arch area of the foot, and heel region 13 corresponds with rear portions of the foot, including the calcaneus bone. Lateral side 14 and medial side 15 extend through each of forefoot region 11, midfoot region 12, and heel region 13 (as seen in FIG. 3) and correspond with opposite sides of footwear 10 that are separated by a lace region 16, which extends along a length of footwear 10. Forefoot region 11, midfoot region 12, heel region 13, lateral side 14, and medial side 15 are not intended to demarcate precise areas of footwear 10. Rather, they are intended to represent general areas of footwear 10 to aid in this description. In addition to footwear 10, forefoot region 11, midfoot region 12, heel region 13, lateral side 14, and medial side 15 may also be applied to upper 20, sole structure 30, and individual elements thereof.

Upper 20 is secured to sole structure 30 and extends between the foot and the ground when footwear 10 is worn. The primary elements of sole structure 30 are a midsole 31, an outsole 32, and a sockliner 33. A lower surface of upper 20 is secured to midsole 31, and midsole 31 may be formed from a compressible polymer foam element (e.g., a polyurethane or ethylvinylacetate foam) that attenuates ground reaction forces (i.e., provides cushioning) when compressed between the foot and the ground during walking, running, or other ambulatory activities. In further configurations, midsole 31 may incorporate fluid-filled chambers, plates, moderators, or other elements that further attenuate forces, enhance stability, or influence the motions of the foot, or midsole 31 may be primarily formed from a fluid-filled chamber. Outsole 32 is secured to a lower surface of midsole 31 and may be formed from a wear-resistant material (e.g., a polymer or a rubber) that is textured to impart traction and provide durability. Sockliner 33 is located within upper 20 and is positioned to extend under a lower surface of the foot. Although this configuration for sole structure 30 provides an example of a sole structure that may be used in connection with upper 20, a variety of other conventional or nonconventional configurations for sole structure 30 may also be utilized. Accordingly, the structure and features of sole structure 30 or any sole structure utilized with upper 20 may vary considerably.

Upper 20 may be stitched or bonded together to form a void within footwear 10 for receiving and securing a foot relative to sole structure 30. The void is shaped to accommodate the foot and extends along the lateral side of the foot, along the medial side of the foot, over the foot, around the heel, and under the foot. Access to the void is provided by an ankle opening 50 located in at least heel region 13.

Lace 40 may extend through various lace apertures 41 and permits the wearer to modify dimensions of upper 20 to accommodate the proportions of the foot. More particularly, lace 40 may permit the wearer to tighten upper 20 around the foot, and lace 40 may permit the wearer to loosen upper 20 to facilitate entry and removal of the foot from the void (i.e., through ankle opening 50). As an alternative to lace apertures 41, upper 20 may include other lace-receiving elements, such as loops, eyelets, and D-rings. In addition, upper 20 may include a tongue 60 that extends between ankle opening 50 and lace 40 to enhance the comfort and performance of footwear 10. In some configurations, upper 20 may incorporate a heel counter that limits heel movement in heel region 13 or a wear-resistant toe guard located in forefoot region 11. In some cases, upper 20 may include a plurality of lace apertures 41, including evenly spaced apertures on lateral side 14 of lace region 16 extending from ankle opening 50 to forefoot region 11. Similarly, upper 20 may include a symmetrical, evenly spaced group of lace apertures 41 on medial side 14 of lace region 16. Lace 40 may be interwoven though apertures 41 in any suitable configuration.

Still referring to FIGS. 1-3, upper 20 includes regions or patterns of printed material 70. Consistent with an embodiment, printed material 70 may be formed by direct 3D printing and curing of material onto upper 20 in any desired pattern, shape, thickness, or coverage. Printing and curing of printed material 70 will be described in greater detail hereinbelow. As shown in FIGS. 1-3, printed material 70 is depicted in an exemplary manner as a pattern of interconnected strips and loops of predetermined thickness attached to various portions of upper 20 to provide structural support and/or aesthetic improvements to footwear 10. Various portions of printed material 70 may be interconnected, but may also not be interconnected. Consistent with an embodiment, printed material 70 is adhered or otherwise bonded to upper 20, may be at least partially absorbed into a surface of upper 20, and may be formed in one or more contiguous or disjointed layers on upper 20. Each of these features will be described in greater detail below.

Consistent with an embodiment, printed material 70, also referred to herein as "three-dimensional material," may be made of a material that includes an ink, a resin, an acrylic, a polymer, a thermoplastic material, a thermosetting material, a light-curable material, or combinations thereof. Also consistent with an embodiment, printed material 70 may be formed from printing of one or more layers in a sequence of depositions of material to any desired thickness, and may also include a filler material to impart a strengthening or aesthetic aspect to printed material 70. For example, the filler material may be a powdered material or dye designed to impart desired color or color patterns or transitions, metallic or plastic particles or shavings, or any other powdered mineral, metal, or plastic, and may customize the hardness, strength, or elasticity of printed material 70 depending on desired properties. Filler material may be premixed with printed material 70 prior to printing, or may be mixed with printed material 70 during printing onto upper 20. Consistent with an embodiment, printed material 70 may thus be a composite material.

Figure 4:
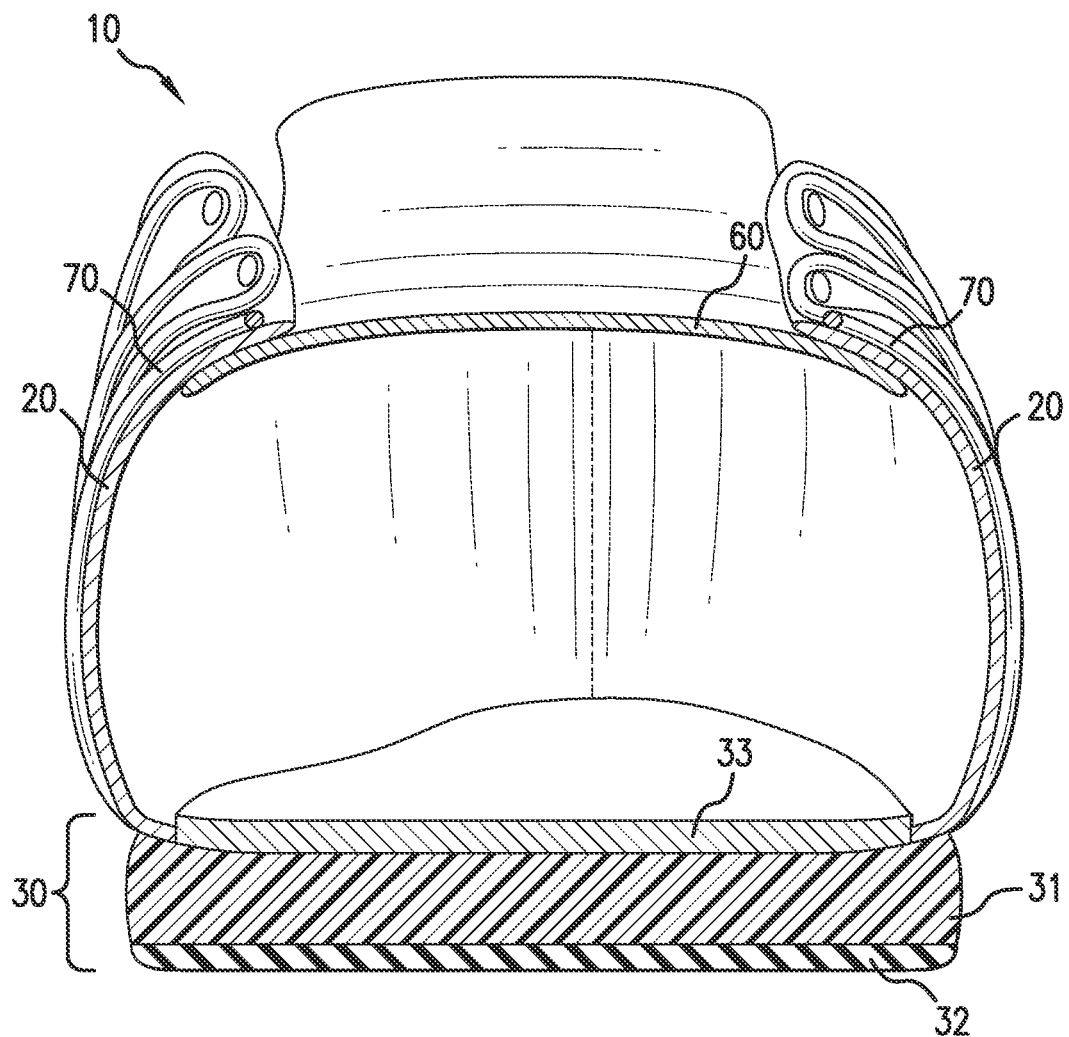
FIG. 4 shows a perspective cutaway view of an article of footwear consistent with an embodiment of the disclosure.
Figure 5:
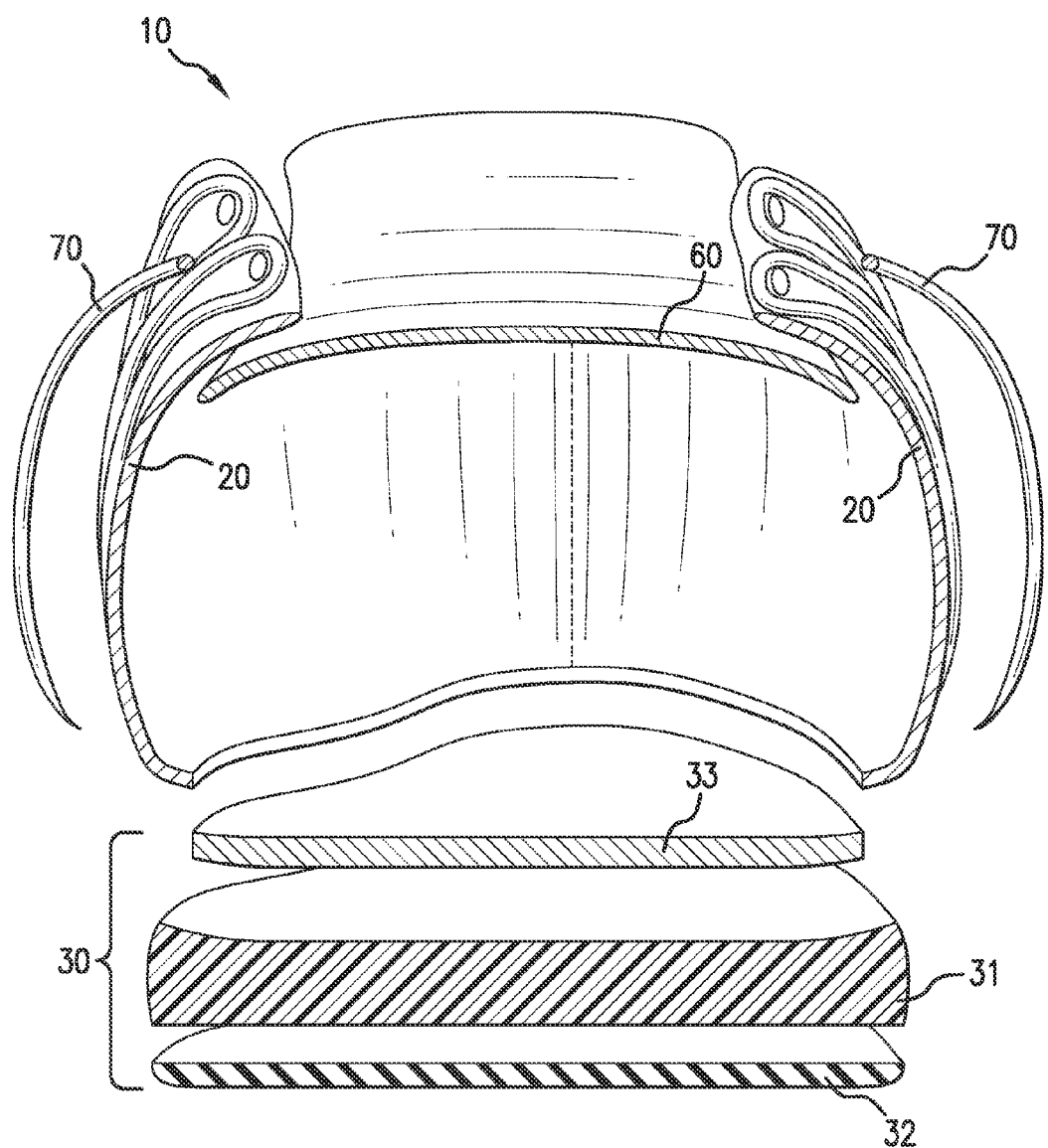
FIG. 5 shows an exploded perspective cutaway view of an article of footwear consistent with an embodiment of the disclosure.

FIGS. 4 and 5 show a perspective cutaway view and exploded perspective cutaway view, respectfully, of section 4 of footwear 10 shown in FIG. 3, including sole structure 30 comprising outsole 32, midsole 31, and sockliner 33. It will be appreciated that some illustrated portions of sole structure 30 may be optional, and certain portions may be omitted in some embodiments. Alternatively, sole structure 30 may optionally comprise additional layers. For example, sole structure 30 may additionally comprise one or more layers of material (not shown) printed in accordance with disclosed embodiments. Such materials may comprise, for example, one or more printed polyurethane layers to form an enclosed region of air or other gas or fluid in one or more regions of sole structure 30, thus providing an enclosed cushioning region (not shown) in footwear 10.

As shown in FIGS. 4 and 5, footwear 10 also includes upper 20 and tongue 60, upper 20 being attached to sole structure 30 as previously described. Consistent with an embodiment, printed material 70 may be adhered or bonded on or in an exterior surface of upper 20. It will be appreciated that some illustrated elements of printed material 70 may vary in appearance. Alternatively, other additional elements may be included. For example, printed material 70 may comprise one or more additional layers to constitute material of any desired thickness, which will be described in greater detail below.

Figure 6:
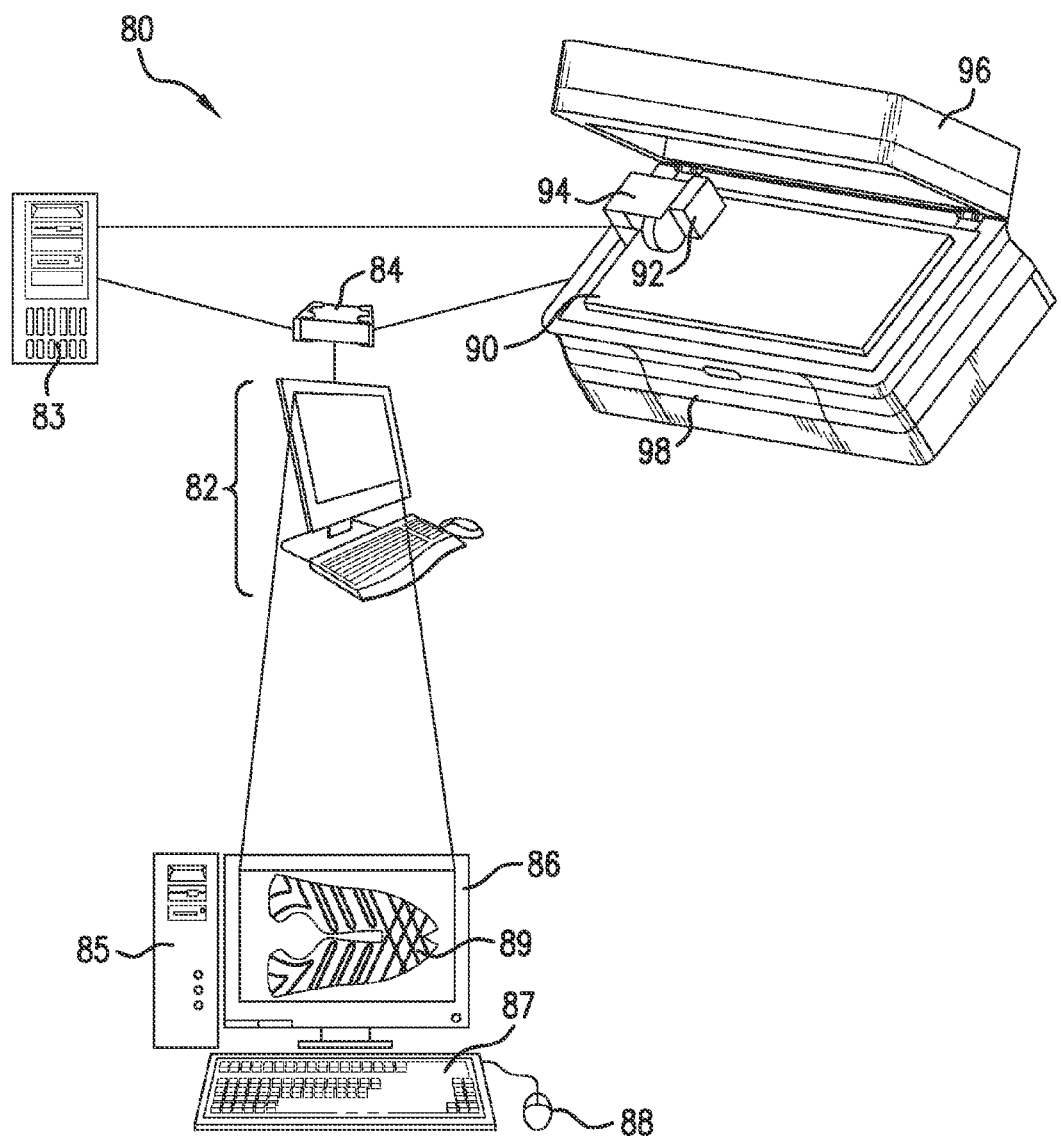
FIG. 6 shows a schematic view of a 3D printing system consistent with an embodiment of the disclosure.

A method for making an article of apparel or footwear may include provisions for direct 3D printing onto the article. Consistent with an embodiment, FIG. 6 shows an exemplary system 80 for 3D printing directly onto a fabric upper, such as, for example, upper 20 shown in any of FIGS. 1-5. System 80 may include 3D printer device 81, computer/workstation 82, print server 83, and optional switching device 84. 3D printer device 81, computer 82, print server 83, and switching device 84 may be in communication and/or networked as shown in FIG. 6. One of ordinary skill in the art will recognize that portions of system 80 may be omitted in some embodiments.

Still referring to FIG. 6, computer 82 may be in direct communication with 3D printer device 81 and print server 83 via switching device 84. For example, print server 83 may be in direct communication with 3D printer device 81 and switching device 84, and switching device 84 may likewise be in direct communication with 3D printer device 81 and print server 83. Print server 83 may include a second nontransitory computer-readable medium encoded with a second computer program product loadable into a memory of print server 83 and include second software code portions for instructing 3D printer device 81 to print directly onto upper 20 through a sequence of printing steps to produce a 3D result of printed material 70 from CAD representation 89 on computer 82. Consistent with an embodiment, one of ordinary skill will understand that system 80 may require both computer 82 and print server 83, or may require just one of computer 82 and print server 83.

Consistent with an embodiment, computer 82 may comprise a central processing device 85, viewing interface 86 (e.g., a monitor or screen), input devices 87 and 88 (e.g., keyboard and mouse), and software for designing a computer-aided design ("CAD") representation 89 of a printing output designed for upper 20. The term "computer," as used throughout the disclosure, means a single computer, the partial computing resources of a computer, or two or more computers communicating with each other. Computer 82 may thus include a first nontransitory computer-readable medium in central processing device 85 encoded with a first computer program product loadable into a memory of computer 82 and include first software code portions for storing a 3D pattern for printing directly onto upper 20. Consistent with an embodiment, computer 82 may be used to prepare a CAD representation 89 for any desired printed pattern or chemistry for printed material 70 on upper 20.

Figure 7:
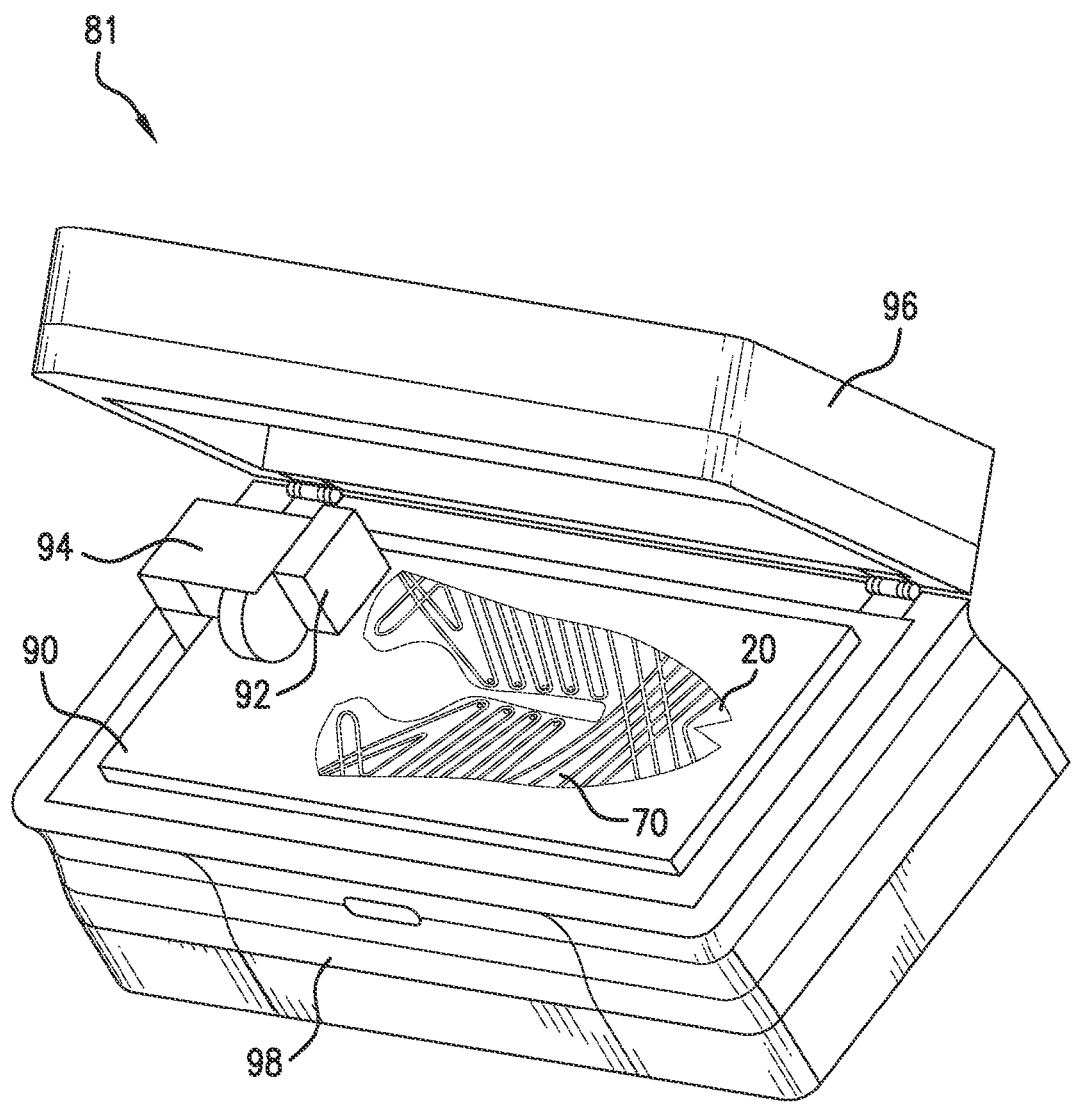
FIG. 7 shows a perspective view of a 3D printer with an upper portion of an article of footwear inserted therein, consistent with an embodiment of the disclosure.

As shown in FIG. 7, 3D printer device 81 comprises a tray 90 for receiving upper 20 for printing. 3D printer device 81 also may comprise at least one printhead 92, printhead maneuverability assembly 94, and lid 96. Printing material to be ejected from at least one printhead 92 may be stored or supplied in compartment 98. Consistent with an embodiment, FIG. 7 illustrates a completed pattern of printed material 70 printed on upper 20, in accordance with exemplary CAD representation 89 shown in FIG. 6, and implemented by print server 83 and/or computer 82. Printhead 92 may also include, for example, a UV light producing mechanism for curing printed material 70 upon printing by printhead 92 as printhead 92 is moved over upper 20 via printhead maneuverability assembly 94. Upon completion of printing onto upper 20, lid 96 may be opened and upper 20 may be removed from 3D printer device 81.

Contrary to what is known in the art, embodiments of the disclosed methods do not require a hydrophobic or otherwise non-wetting surface on which to print. One of ordinary skill in the art will understand that known 3D printing systems require a hydrophobic sheet or release layer on a tray or substrate prior to printing/building of a 3D object. Such a hydrophobic sheet or release layer may be preexisting on the tray or substrate, or may be a printed hydrophobic material provided by the 3D printing system itself. In known 3D printing systems, the required hydrophobic sheet or release layer prevents wetting of printed material onto the tray or substrate during printing/building of the 3D object and thus permits removal of the 3D object from the tray or substrate upon completion of printing. Consistent with an embodiment, however, 3D printer device 81 does not require a hydrophobic or otherwise non-wetting surface on which to print, because 3D printing is accomplished directly onto a material (e.g., upper 20) placed on tray 90. Upper 20, if an exemplary fabric material, may also be hydrophilic. That is, wetting and adhering/bonding/curing of printed material 70 to upper 20 is desirable. After printing, upper 20 may be removed from tray 90 with printed material 70 adhered/bonded/cured to upper 20, and without concern for adhesion of upper 20 or printed material 70 to tray 90.

Contrary to what is known in the art, embodiments of the disclosed methods also do not require a perfectly or near perfectly flat substrate surface on which to print. One of ordinary skill in the art will understand that known 3D printing systems require a perfectly or near perfectly flat substrate surface on which to print in order to allow the systems to print/build 3D objects on a planar surface. Consistent with an embodiment, however, upper 20—even if laid substantially flat inside 3D printer device 81 on tray 90—may still have an uneven surface due to either the knit or weave of its fabric, or irregular surface topology in general due to the need for subsequent working and assembly steps. Consistent with an embodiment, 3D printer device 81 may account for surface irregularities of upper 20, and compensate for any such irregularities by adjusting one or more of the distance between printhead 92 and upper 20, and the size/rate/distribution of material ejected from printhead 92 during printing onto upper 20. That is, printing may occur directly onto a surface of upper 20, such that upper 20 may be subsequently removed from 3D printer device 81 without any concern for surface irregularities in upper 20.

Figure 8:
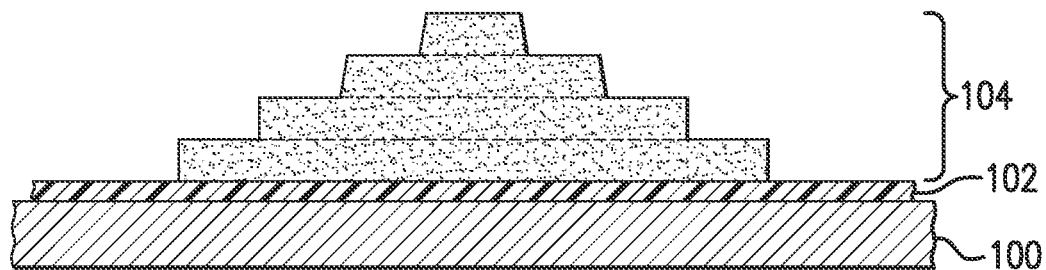
FIG. 8 shows a cross sectional view of a conventional 3D printed surface on a release layer over a substrate.
Figure 9:
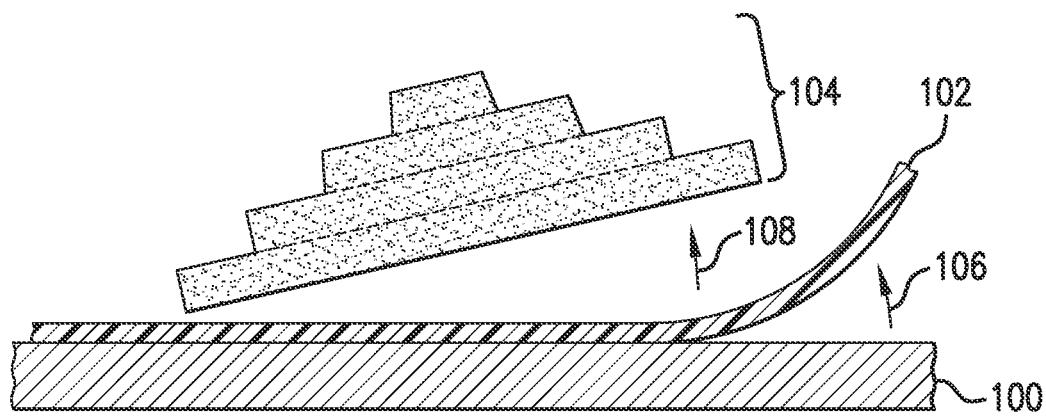
FIG. 9 shows a cross sectional view of a conventional 3D printed surface being removed from a release layer and substrate.

For example, with reference to FIGS. 8 and 9, known 3D printing techniques require printing on flat substrate 100 having a release layer 102 placed/formed/printed thereon. To prevent printed object 104 from adhering to substrate 100, release layer 102 is interspersed therebetween. Release layer 102 could be a wax paper, for example, or a layer of hydrophobic printed material to facilitate removal of printed object 104 from substrate 100. As shown in FIG. 9, removal of printed material 104 may thus be accomplished by removing release layer 102 from substrate 100 as shown by motion 106, followed by removal of printed material 104 from release layer 102 as shown by motion 108. Thus, known 3D printing techniques require both a flat surface on which to print, and a release layer to prevent adhesion of the printed material to the substrate after printing is complete.

Figure 10:
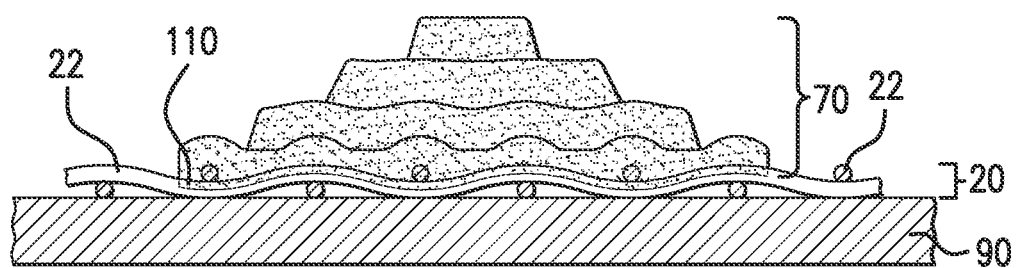
FIG. 10 shows a cross sectional view of a 3D printed material on an upper portion of an article of footwear, consistent with an embodiment of the disclosure.
Figure 11:
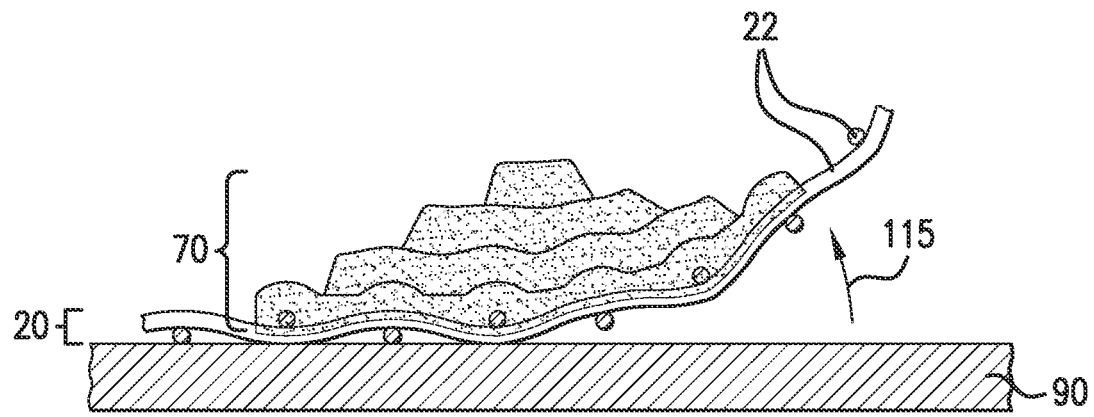
FIG. 11 shows a cross sectional view of a 3D printed material on an upper portion of an article of footwear being removed from a tray, consistent with an embodiment of the disclosure.
Figure 12:
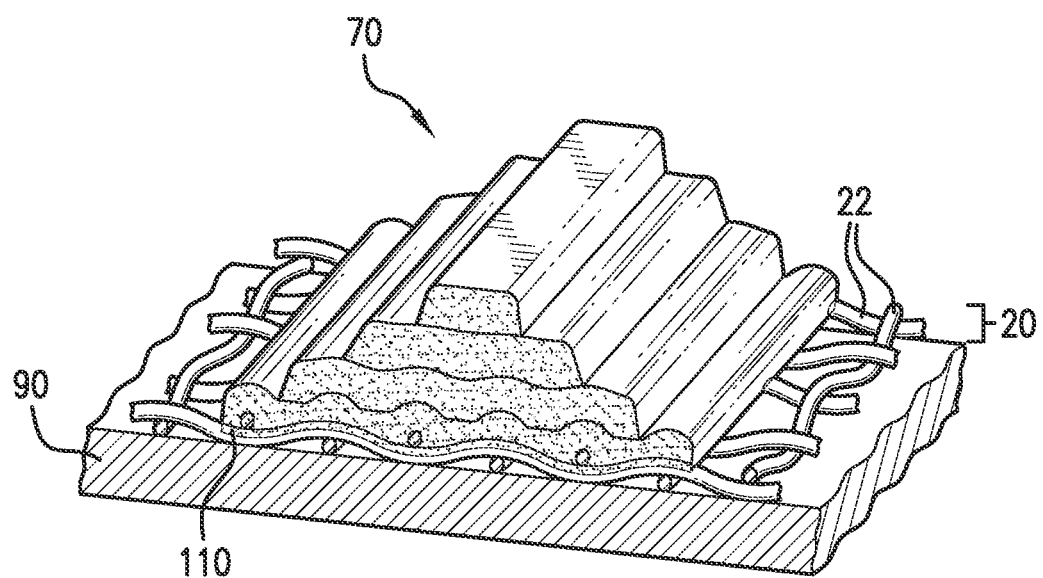
FIG. 12 shows a perspective view of a 3D printed material on an upper portion of an article of footwear, consistent with an embodiment of the disclosure.
Figure 13:
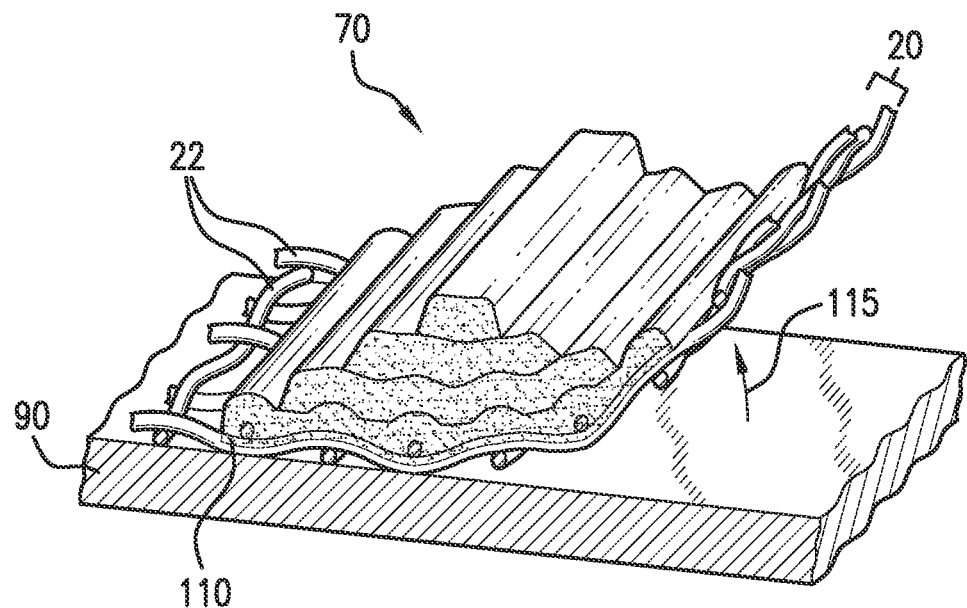
FIG. 13 shows a perspective view of a 3D printed material on an upper portion of an article of footwear being removed from a tray, consistent with an embodiment of the disclosure.

Contrary to what is known in the art, FIGS. 10 and 11, and likewise 12 and 13, illustrate a portion of a 3D printing technique consistent with an embodiment. For example, FIGS. 10 and 11 show a cross sectional view of upper 20 placed on tray 90. Upper 20 is depicted as comprising threads 22, which may be placed in different directions, although threads 22 could be configured in any manner, such as any density or thickness, to form upper 20. Printed material 70 may comprise one or more layers of material sequentially printed onto upper 20. Consistent with an embodiment, printed material 70 may be at least partially absorbed into a surface region 110 of upper 20 after printing and prior to curing. Partial absorption in surface region 110 of printed material 70 may aid in adhesion/bonding of printed material 70 to upper 20. FIGS. 12 and 13 likewise illustrate a perspective view of upper 20 placed on tray 90 and having printed material 70 printed thereon.

As shown in FIGS. 11 and 13, and consistent with an embodiment, removal of upper 20 containing printed material 70 may be accomplished by simply lifting upper 20 away from tray 90, as shown by motion 115. Because printed material 70 is printed/deposited onto upper 20, and may be at least partially absorbed into a surface region 110, upper 20 may thus serve as a "substrate" such that there is no need for a release layer interspersed between upper 20 and printed material 70, or between tray 90 and upper 20. That is, wetting and adhering/bonding/curing of printed material 70 to upper 20 is desirable and accomplished. After printing, upper 20 may be removed from tray 90 with printed material 70 adhered/bonded/cured to upper 20, and without concern for adhesion of upper 20 or printed material 70 to tray 90. Consistent with an embodiment, a release layer may be optionally used, however unlikely, for example if upper 20 is so thin or contains a particularly low density of threads 22 such that portions of printed material 70 might pass between individual threads 22 of upper 20 and directly contact tray 90.

Figure 14:
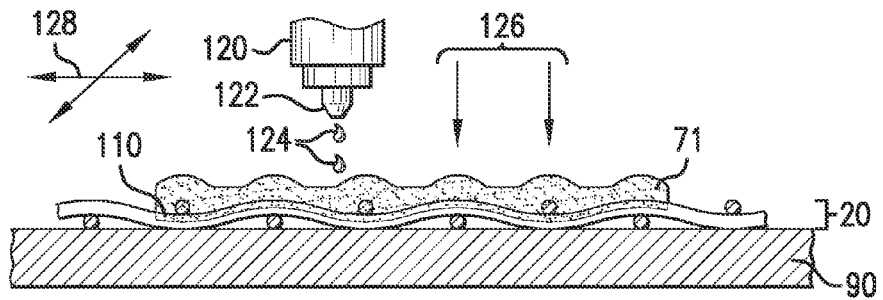
FIG. 14 shows a cross sectional view of a first layer of 3D printed material on an upper portion of an article of footwear and a curing process, consistent with an embodiment of the disclosure.

Consistent with an embodiment, FIGS. 14-17 illustrate cross sectional views of a printing sequence of multiple 3D layers of printed material 70 on upper 20. For example, FIG. 14 illustrates first layer 71 of printed material 70 deposited onto upper 20. Printed material 70 may be ejected or otherwise emitted from printhead 120 via nozzle 122 in the form of droplets 124. One of ordinary skill in the art will recognize that the form of droplets 124 may vary depending on the actual material ejected or otherwise emitted from nozzle 122. Droplets 124 may thus be any viscosity liquid material, or even a semi-solid material. Consistent with an embodiment, droplets 124 may be any desired material or phase of material suitable for use in 3D printing system 80.

Still referring to FIG. 14, in some embodiments, first layer 71 may be cured by UV light 126, however, in other embodiments, first layer 71 may be deposited without the need to cure the deposited material. Depending on the material used for printing of printed material 70, the material may be deposited in a liquid, semi-liquid, or otherwise gel-like or viscous phase. The material may then be solidified, at least partially, or cured, for various reasons, or to achieve desired properties, for example, to enhance durability, adhesion, or bonding of printed material 70 to upper 20. FIGS. 14-17 thus illustrate UV light 126 as an exemplary curing agent for use after deposition of printed material 70. One of ordinary skill in the art will understand that UV light 126 may be activated/applied either immediately after deposition of first layer 71, or at any desired time thereafter, depending on the nature of the desired patterns/chemistry/thickness of printed material 70. For simplicity, exemplary FIGS. 14-17 illustrate UV light 126 applied to cure printed material 70 after deposition of each layer. Depending on the material used for printing of printed material 70, one of ordinary skill in the art will recognize that curing of printed material 70 may be optional.

Still referring to FIG. 14, and consistent with an embodiment, printed material 70 may be at least partially absorbed into a surface region 110 of upper 20 prior to curing. For example, printed material 70 may be allowed to absorb into upper 20 for a predetermined amount of time after deposition and prior to curing with UV light 126. One of ordinary skill in the art will understand that such a predetermined amount of time will vary depending on the material used for printed material 70, as an absorption rate may be affected by the wettability or permeability of upper 20 to the deposited material, the viscosity or temperature of the material during printing, and the pressure or speed at which the material is ejected from printhead 92 onto upper 20. Consistent with an embodiment, therefore, such a predetermined amount of time after deposition and prior to optional curing with UV light 126 may be essentially immediately after deposition, or may be contemplated seconds or minutes thereafter.

Figure 15:
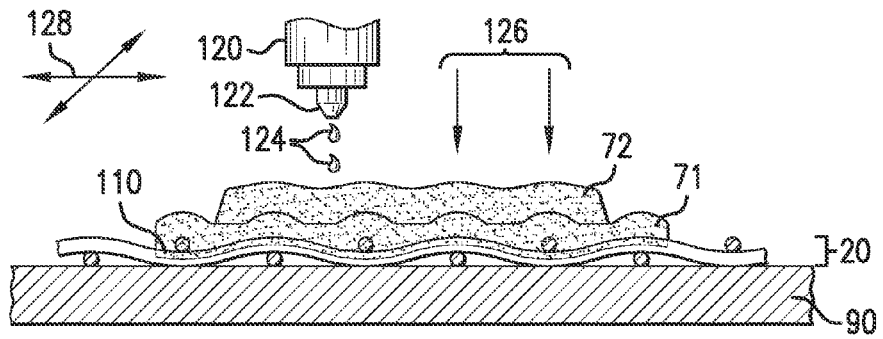
FIG. 15 shows a cross sectional view of a second layer of 3D printed material on an upper portion of an article of footwear and a curing process, consistent with an embodiment of the disclosure.

Consistent with an embodiment, FIG. 15 illustrates second layer 72 of printed material 70 deposited onto layer 71, and cured by UV light 126. Second layer 72 may or may not be partially absorbed into a portion of first layer 71 prior to curing. Consistent with an embodiment, second layer 72 (and any subsequent layers) need not be deposited solely on the immediately underlying layer. One of ordinary skill in the art will understand that variations in printing patterns/thicknesses layers are contemplated. For example, second layer 72 may be deposited on any desired portion of upper 20, which may include partial or complete coverage of layer 71, or may include no coverage of layer 71. For example, if second layer 72 is partially deposited on layer 71 and partially deposited on upper 20, second layer 72 may or may not be partially absorbed into a portion of first layer 71 and a portion of upper 20 prior to optional curing.

Figure 16:
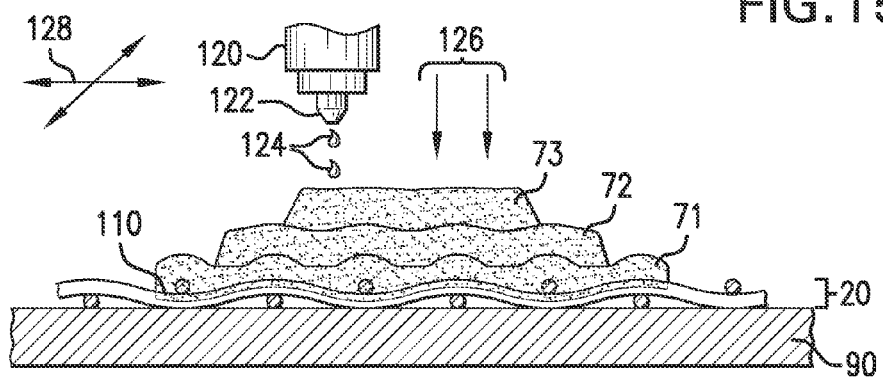
FIG. 16 shows a cross sectional view of a third layer of 3D printed material on an upper portion of an article of footwear and a curing process, consistent with an embodiment of the disclosure.
Figure 17:
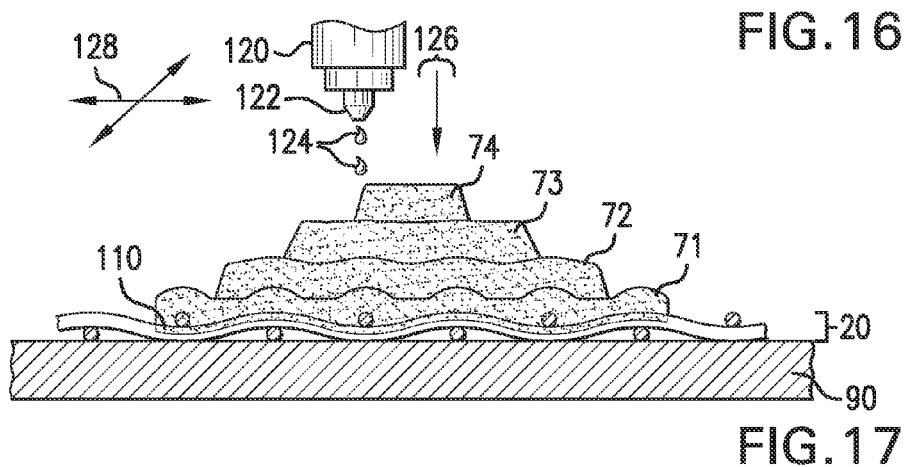
FIG. 17 shows a cross sectional view of a fourth layer of 3D printed material on an upper portion of an article of footwear and a curing process, consistent with an embodiment of the disclosure.

Consistent with an embodiment, FIG. 16 illustrates a third layer 73 of printed material 70 deposited onto layer 72, and optionally cured by UV light 126. Third layer 73 may or may not be partially absorbed into at least a portion of second layer 72, at least a portion of first layer 71, and/or at least a portion of upper 20 if so printed, prior to curing. FIG. 17 likewise illustrates a fourth layer 74 of printed material 70 deposited onto layer 73, and optionally cured by UV light 126. Fourth layer 74 may or may not be partially absorbed into at least a portion of third layer 73, at least a portion of second layer 72, at least a portion of first layer 71, and/or at least a portion of upper 20 if so printed, prior to optional curing. Consistent with an embodiment, any number of layers may be printed to form printed material 70. Also consistent with an embodiment, upper 20 may be removed from tray 90 upon completion of printing, as shown in FIG. 13.

One of ordinary skill in the art will recognize that the printed layers forming printed material 70 may originate with different materials, colors, chemistries, optional fillers, etc., in order to fully customize the desired properties of upper 20. Printed material may also comprise layers having gradients of colors blended amongst the layers, or may comprise gradients of elasticity due to variations in material ejected from printhead 92 during printing of printed material 70. For example, printed material 70 may comprise layers of low elasticity printed material alternated or in conjunction with layers of high elasticity material. Consistent with an embodiment, exemplary moduli of elasticity for printed material 70 may range from about 10 MPa to about 4,000 MPa. Consistent with an embodiment, exemplary flexural strength for printed material 70 may range from about 35 MPa to about 300 MPa. Consistent with an embodiment, exemplary flexural moduli for printed material 70 may range from about 1,200 MPa to about 12,000 MPa. And, consistent with an embodiment, exemplary tensile strength for printed material 70 may range from about 0.5 MPa to about 150 MPa.

One of ordinary skill in the art will also recognize that the printed layers forming printed material 70 may comprise layers of material having at least a first color alternated or in conjunction with layers having at least a second color. For example, printed material 70 may be designed to impart high strength and low elasticity in heel region 13, while maintaining high elasticity and flexibility in toe region 11, and such properties may be accomplished by varying the properties of printed material 70 through printing of different combinations of materials and layers in any desired manner on any surface of upper 20.

Figure 18:
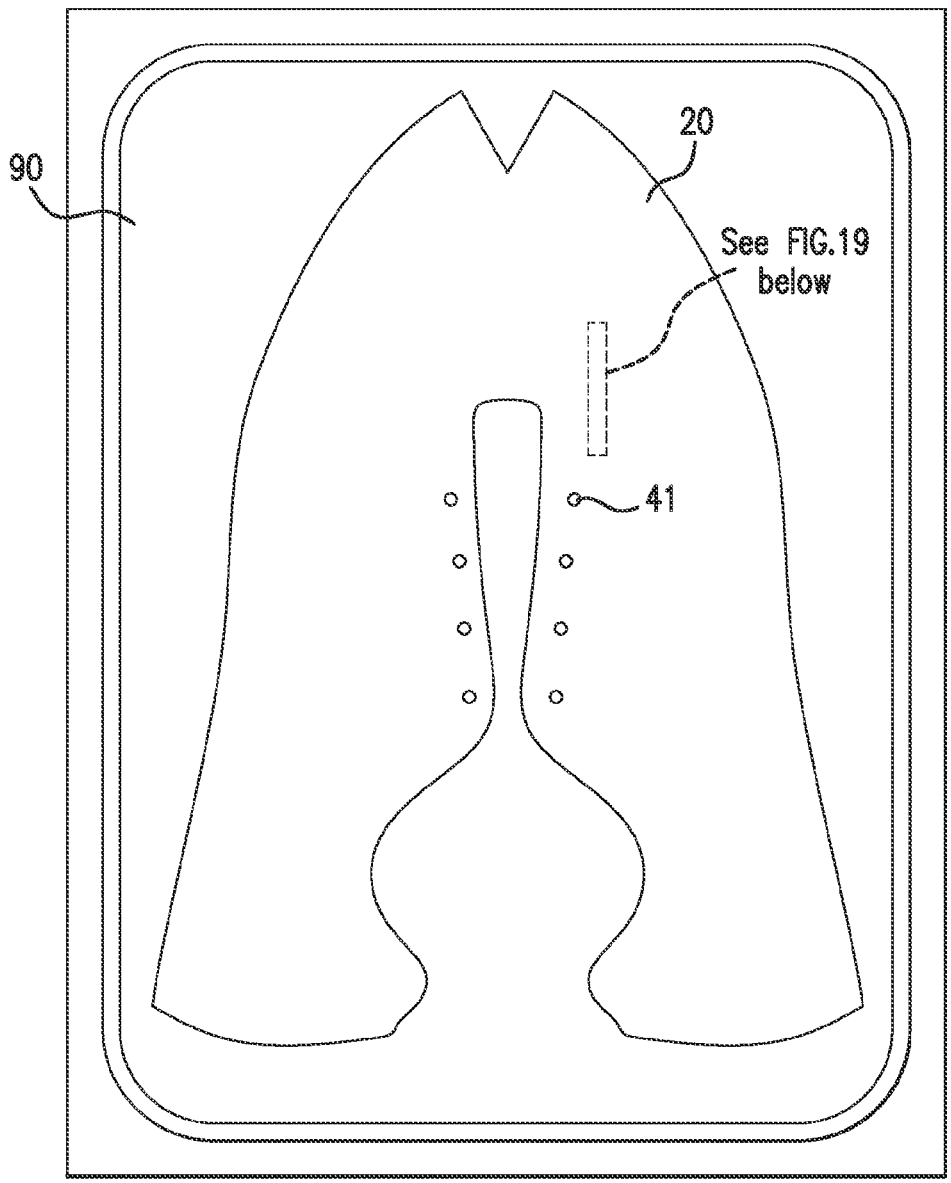
FIG. 18 shows an overhead view of an upper portion of an article of footwear placed on a tray and prior to 3D printing, consistent with an embodiment of the disclosure.
Figure 19:
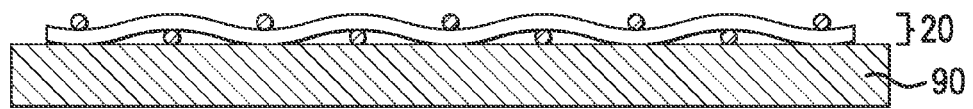
FIG. 19 shows a cross sectional view of part of the upper portion of an article of footwear shown in FIG. 18 placed on a tray and prior to 3D printing, consistent with an embodiment of the disclosure.

Consistent with an embodiment, FIG. 18 illustrates an overhead view of upper 20 placed on tray 90 prior to 3D printing in system 80, and FIG. 19 illustrates a cross sectional view of the indicated portion of FIG. 14 showing upper 20 on tray 90. As shown in FIGS. 18 and 19, upper 20 may be positioned substantially flat on tray 90 in 3D printer 81. Upper 20 may further be positioned and aligned with fiduciary marks (not shown) to coordinate alignment with CAD representation 89 from computer 82 to facilitate accurate printing.

Figure 20:
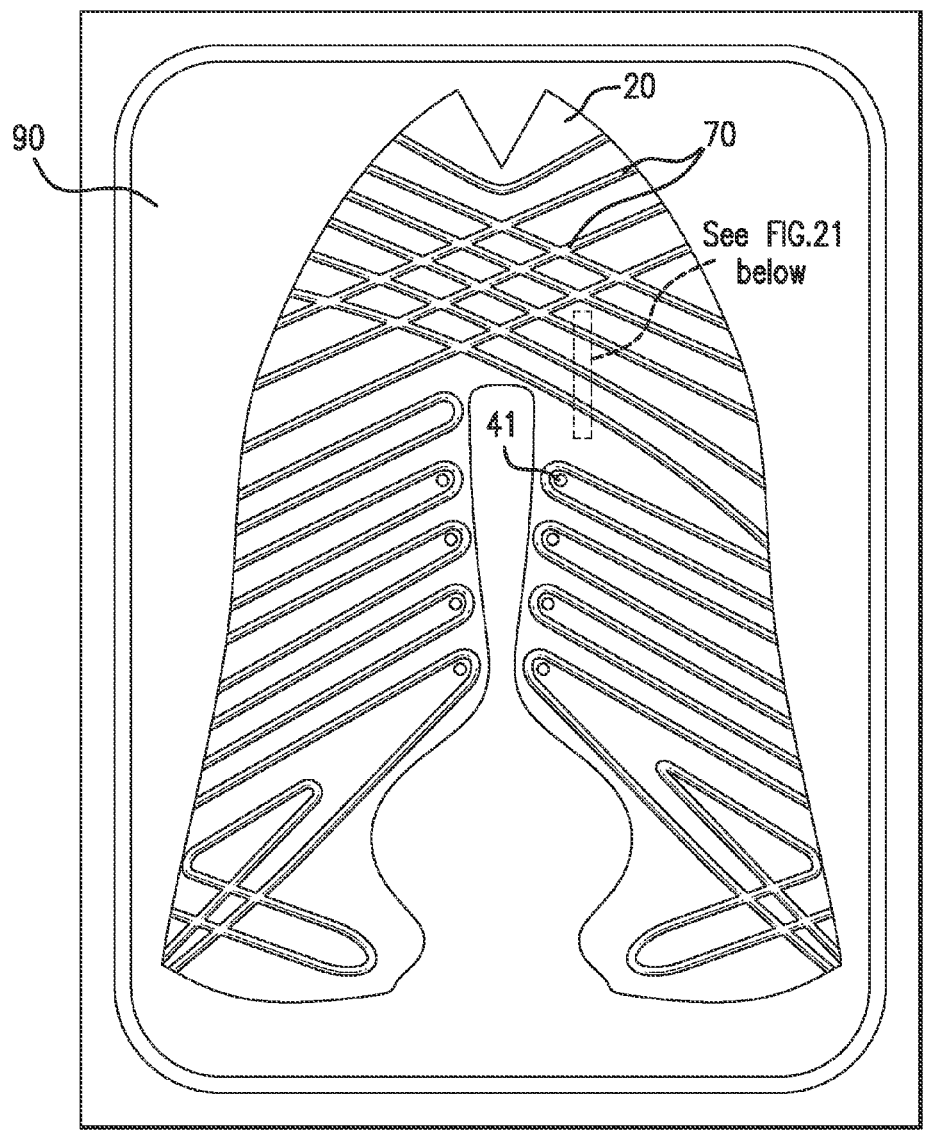
FIG. 20 shows an overhead view of an upper portion of an article of footwear placed on a tray and post 3D printing, consistent with an embodiment of the disclosure.
Figure 21:
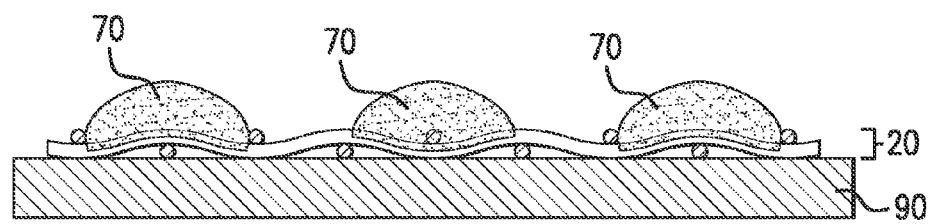
FIG. 21 shows a cross sectional view of part of the upper portion of an article of footwear shown in FIG. 20 placed on a tray and post 3D printing, consistent with an embodiment of the disclosure.

Consistent with an embodiment, FIG. 20 illustrates an overhead view of upper 20 placed on tray 90 after 3D printing in system 80, and FIG. 21 illustrates a cross sectional view of the indicated portion of FIG. 20 showing exemplary printed material 70 on upper 20. As shown in FIGS. 20 and 21, printed material 70 is deposited on upper 20 in any desired pattern or number of layers, in accordance with a desired CAD representation 89 from computer 82 in implementation of system 80 shown in FIG. 6. It will be recognized that printed material 70, shown in FIG. 21, may appear to be one continuous deposit of material as shown, although it may actually comprise multiple layers of sequentially printed material to form a desired printed pattern resulting in printed material 70 as shown.

Figure 22:
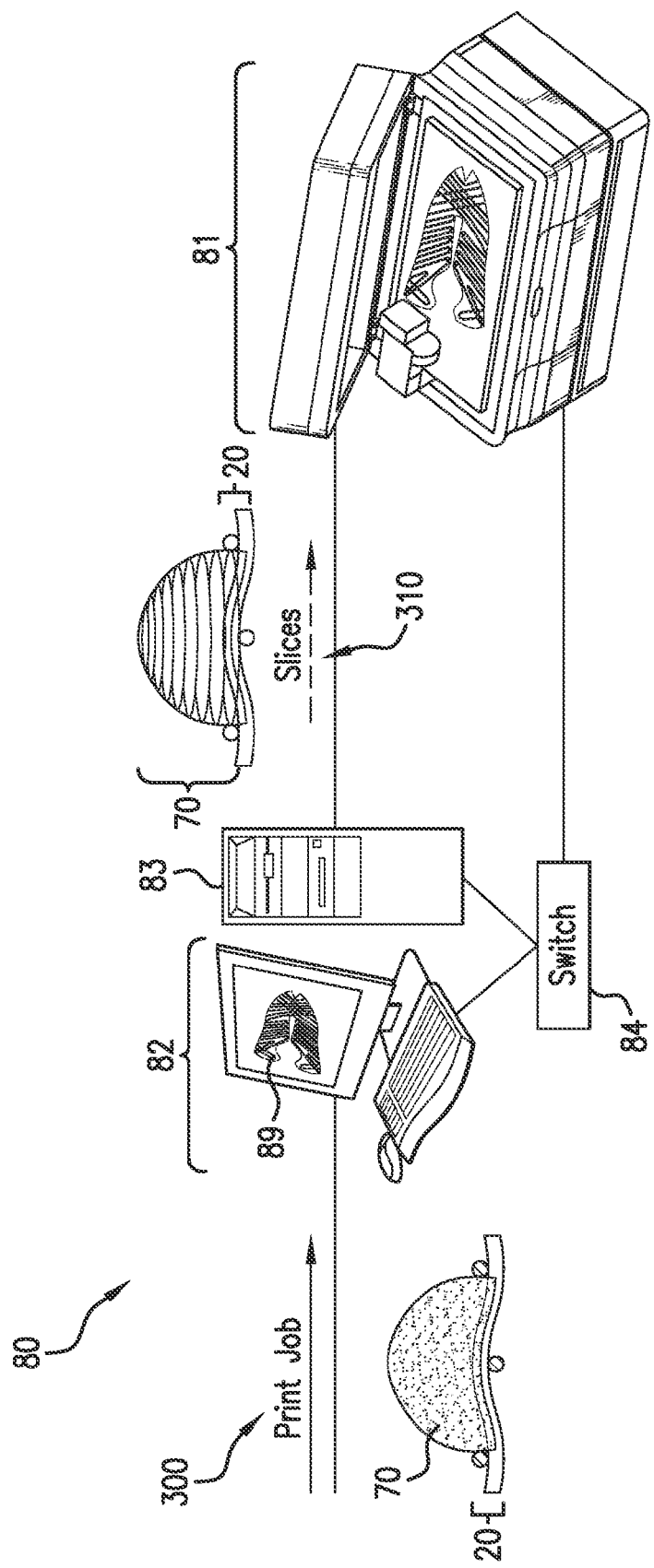
FIG. 22 shows a schematic view of a 3D printing system and method consistent with an embodiment of the disclosure.

For example, consistent with an embodiment, FIG. 22 illustrates an exemplary printing job 300 using system 80 to produce printed material 70 as shown and described with reference to FIGS. 20 and 21. Printing job 300 in FIG. 22 will be further described consistent with exemplary process flow 400 shown in FIG. 23.

Figure 23:
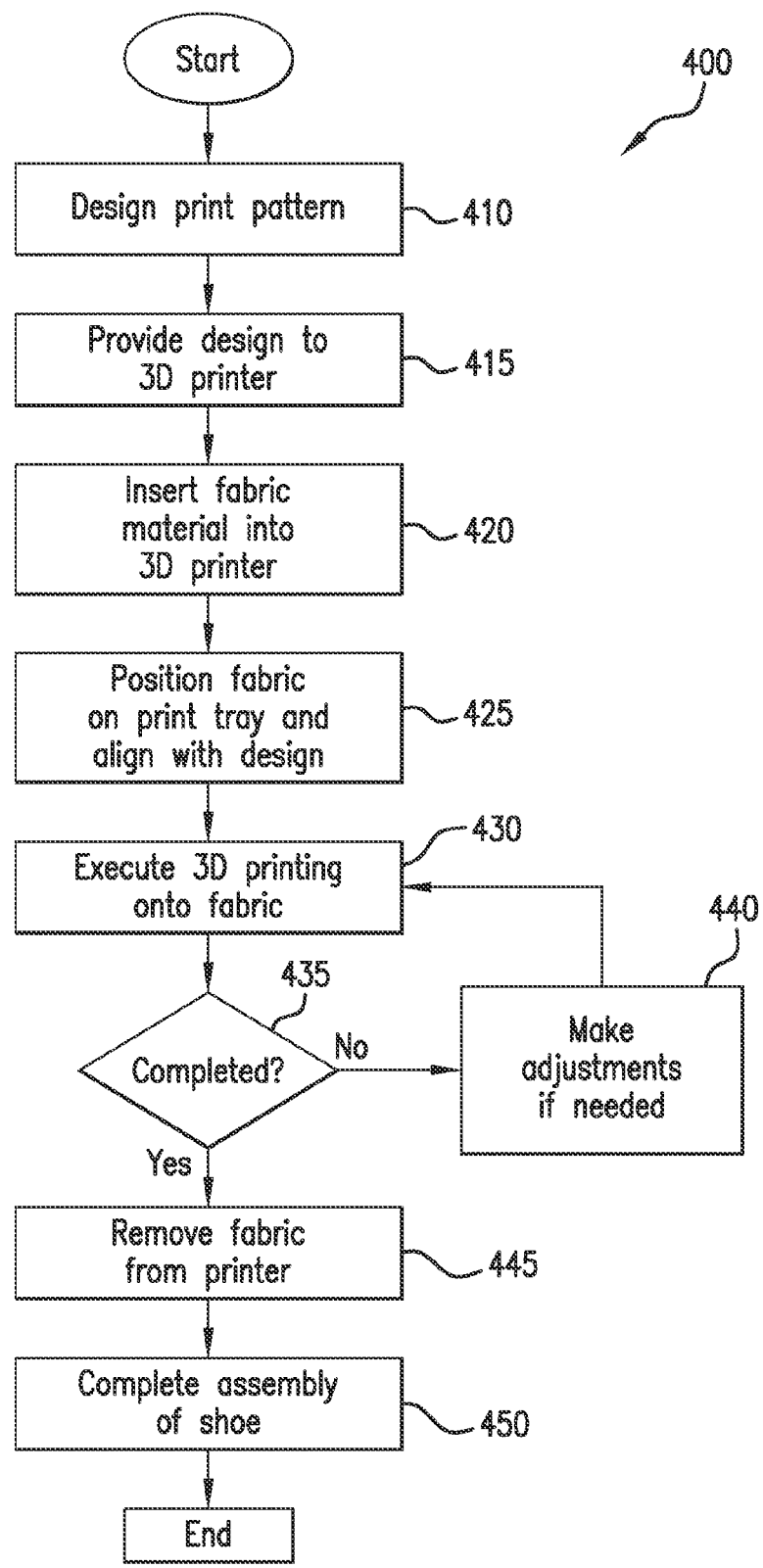
FIG. 23 shows a process for manufacturing an article of footwear, consistent with an embodiment of the disclosure.

FIG. 23 shows an exemplary process 400 for 3D printing onto upper 20, consistent with an embodiment. It will be appreciated that some or all steps in the process may be completed by a footwear, apparel, or equipment manufacturer or proprietor. In other cases, some steps could be accomplished by a manufacturer and other steps could be accomplished by another party including another manufacturer, proprietor, retailer, or any other entity. In some cases, one or more of the steps may be optional. In other cases, some steps may be completed in a different order.

As shown in FIG. 23, exemplary process 400 for 3D printing onto upper 20 begins with step 410. In step 410, computer 82 may be used to design a print pattern and form CAD representation 89 shown in FIG. 22. CAD representation 89 may be any desired printing job on any surface, such as upper 20.

In step 415, CAD representation 89 may be provided to print server 83 via optional switching device 84. Print server 83 may process CAD representation 89 into any number of slices 310 designed to accomplish 3D printing of print material 70 to any desired pattern or thickness in 3D printer 81. One of ordinary skill in the art will recognize that slices 310 may be representations designed to correspond to actual printed layers of material forming printed material 70, such as, for example, layers 71-74 shown and described with reference to FIGS. 14-17.

In step 420, a fabric material such as upper 20 may be positioned in 3D printer device 81 on tray 90, as shown in FIG. 7. In step 425, fabric material such as upper 20 may be aligned as described above with respect to FIG. 18 to facilitate accurate printing of any desired CAD representation 89 and any number of slices 310.

In step 430, 3D printer 81 executes printing onto fabric material such as upper 20, using slices 310 provided by computer 82 and print server 83 as guides for printing and curing multiple layers of material to form printed material 70, such as those shown in FIGS. 10-13. As discussed above, printing may include printing a resin, acrylic, or ink material onto a fabric, where the material is adhered/bonded to the fabric and where the material does not generally delaminate when flexed, rolled, worked, or subject to additional assembly processes/steps. Consistent with step 430, printed material 70 may be an ink, a resin, an acrylic, a polymer, a thermoplastic material, a thermosetting material, a light-curable material, or combinations thereof. Printed material 70 may also include a filler material (not shown) to impart a strengthening or aesthetic aspect to printed material 70 in one or more layers printed using slices 310. For example, the filler material incorporated in printed material 70 may be a powdered material or dye designed to impart desired color or color patterns or transitions, metallic or plastic particles or shavings, or any other powdered mineral, metal, or plastic. Consistent with an embodiment, printed material 70 printed in step 430 may thus be a composite material.

In step 435, progress of printing in 3D printer 81 may be periodically evaluated. For example, one may evaluate the progress of printing after several layers of material are printed and cured, as shown, for example, in FIGS. 14-17.

In step 440, if desired printing is not complete, or if adjustments are desired during printing, fabric material such as upper 20 may be repositioned on tray 90 and realigned to facilitate printing of desired CAD representation 89 by proceeding back to step 430.

In step 445, if desired printing is complete, fabric material such as upper 20 may be inspected and removed from 3D printer 81 by lifting upper 20 off of tray 90 by motion 115 shown in FIGS. 11 and 13. In step 445, desired printing may appear as shown in FIGS. 20 and 21, where printed material 70 is formed to any desired pattern and thickness, and may or may not be partially absorbed into a portion 110 of the surface of upper 20.

In step 450, for example, shoe assembly may subsequently be completed by securing a sole structure 30 to a lower portion of upper 20 so as to be positioned between the foot and the ground, as shown, for example, in FIGS. 1-5.

Figure 24:
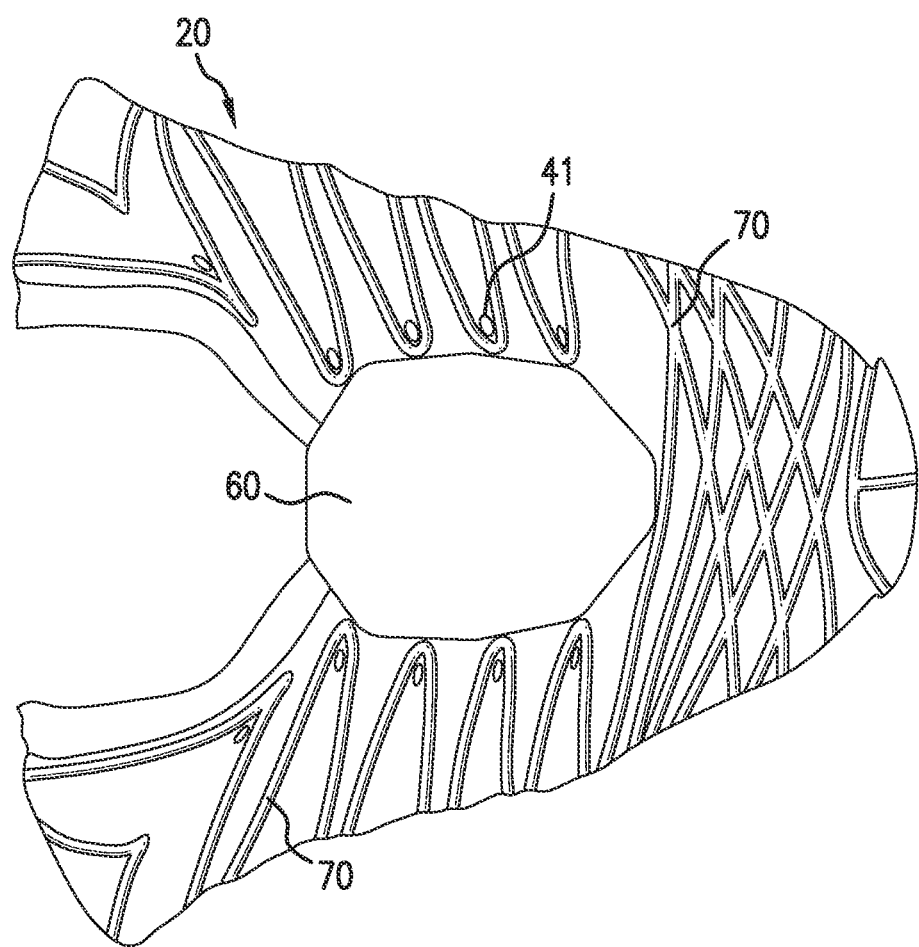
FIG. 24 shows an overhead view of an upper portion of an article of footwear after printing and prior to completion of footwear assembly consistent with an embodiment of the disclosure.
Figure 25:
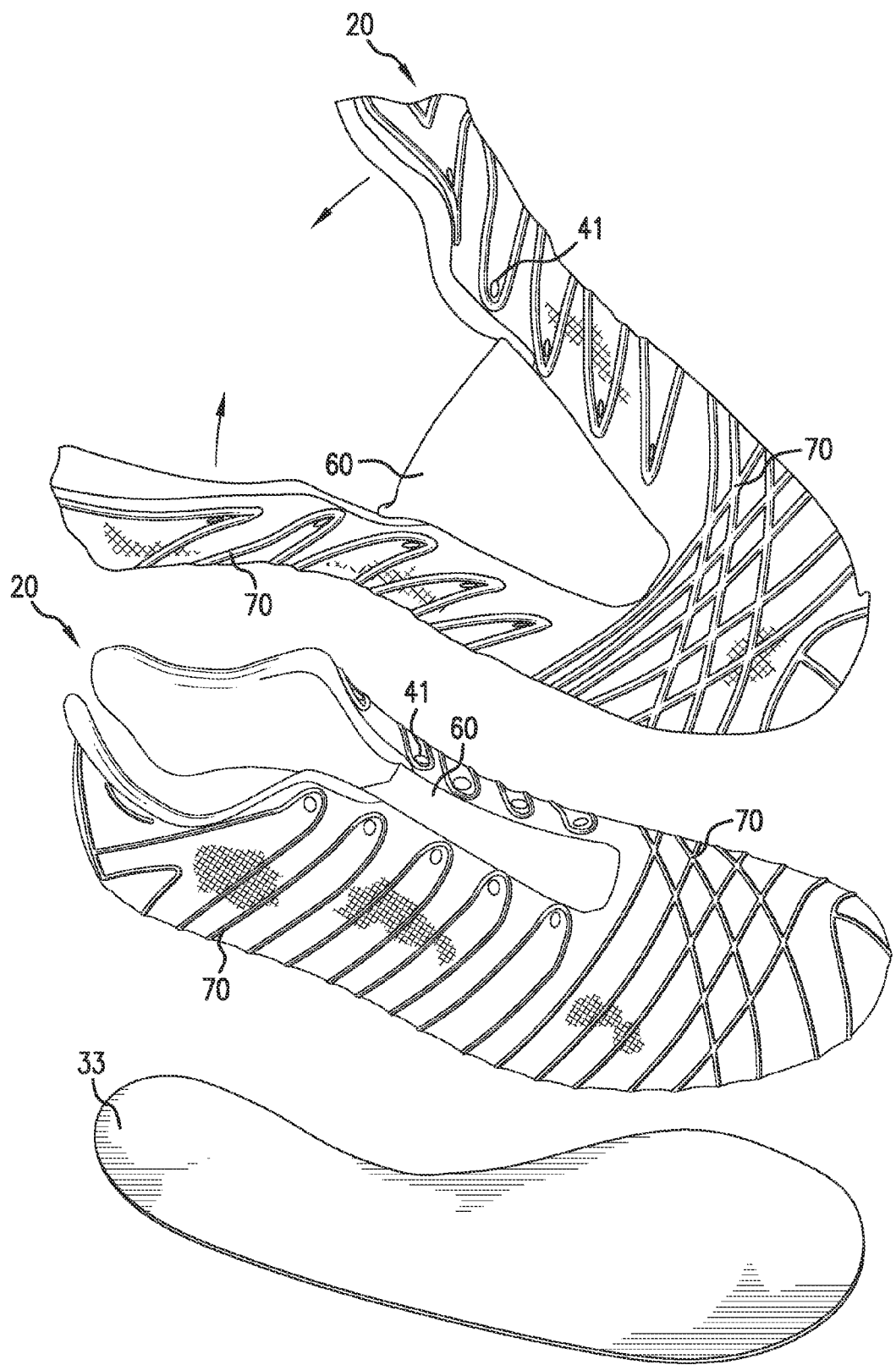
FIG. 25 shows a perspective view of an upper portion of an article of footwear after printing and during placement in contact with a sole portion during assembly consistent with an embodiment of the disclosure.

Consistent with an embodiment, FIG. 24 illustrates an approximately plan view of upper 20 including tongue 60 and lace apertures 41 laid substantially flat after printing of printed material 70 and prior to assembly of footwear 10 shown in FIGS. 1-5. Similarly, FIG. 25 illustrates upper 20 including tongue 60, lace apertures 41, and printed material 70 disposed on sockliner 33 during a portion of an exemplary assembly process of manufacturing footwear 10. It will be appreciated that some illustrated elements of assembly of footwear 10 may vary or not be shown in the interest of simplifying illustrations throughout this disclosure. Alternatively, other additional elements or assembly steps may be included. For example, upper 20 may be joined to sockliner 33 using thermoforming applications, such as polymer heat seal seam tapes as disclosed in U.S. Pat. No. 8,028,440, which is incorporated herein by reference.

Figure 26:
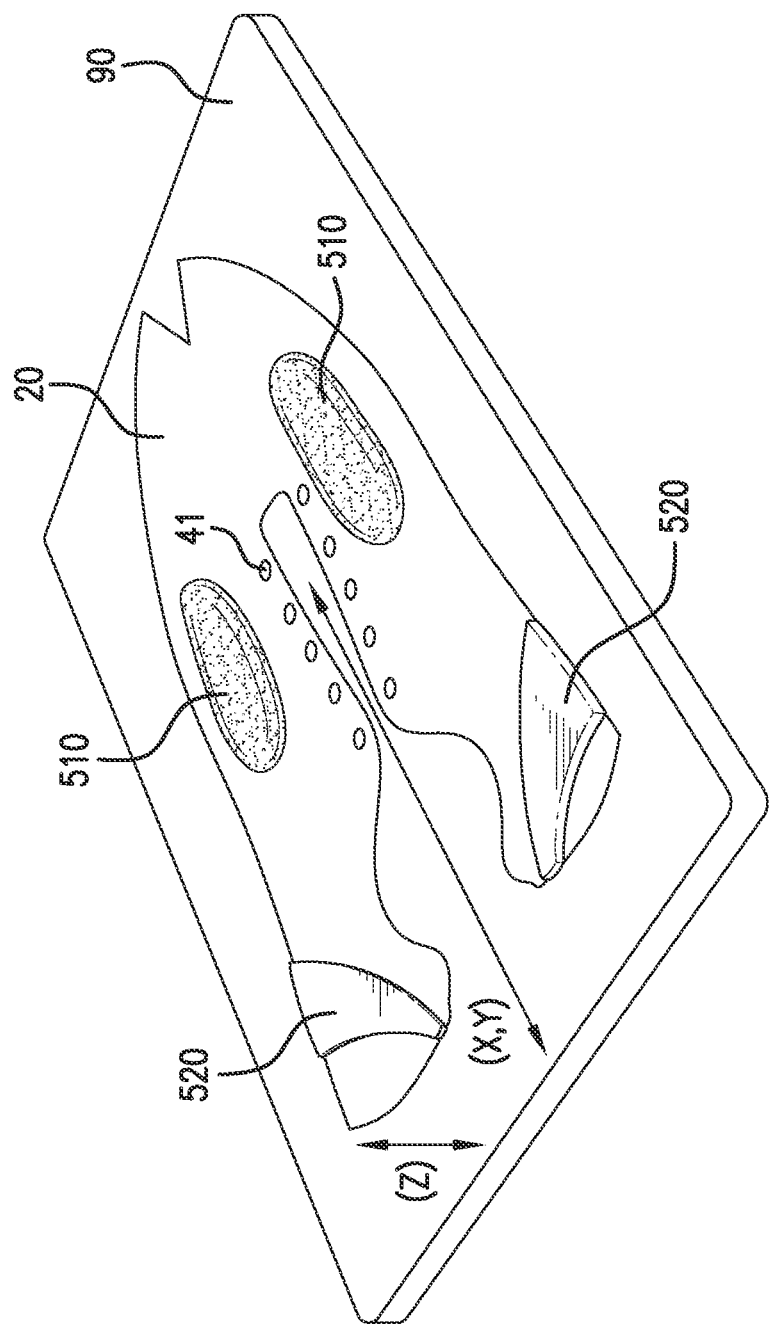
FIG. 26 shows a perspective view of an upper portion of an article of footwear after 3D printing and prior to completion of footwear assembly consistent with an embodiment of the disclosure.
Figure 27:
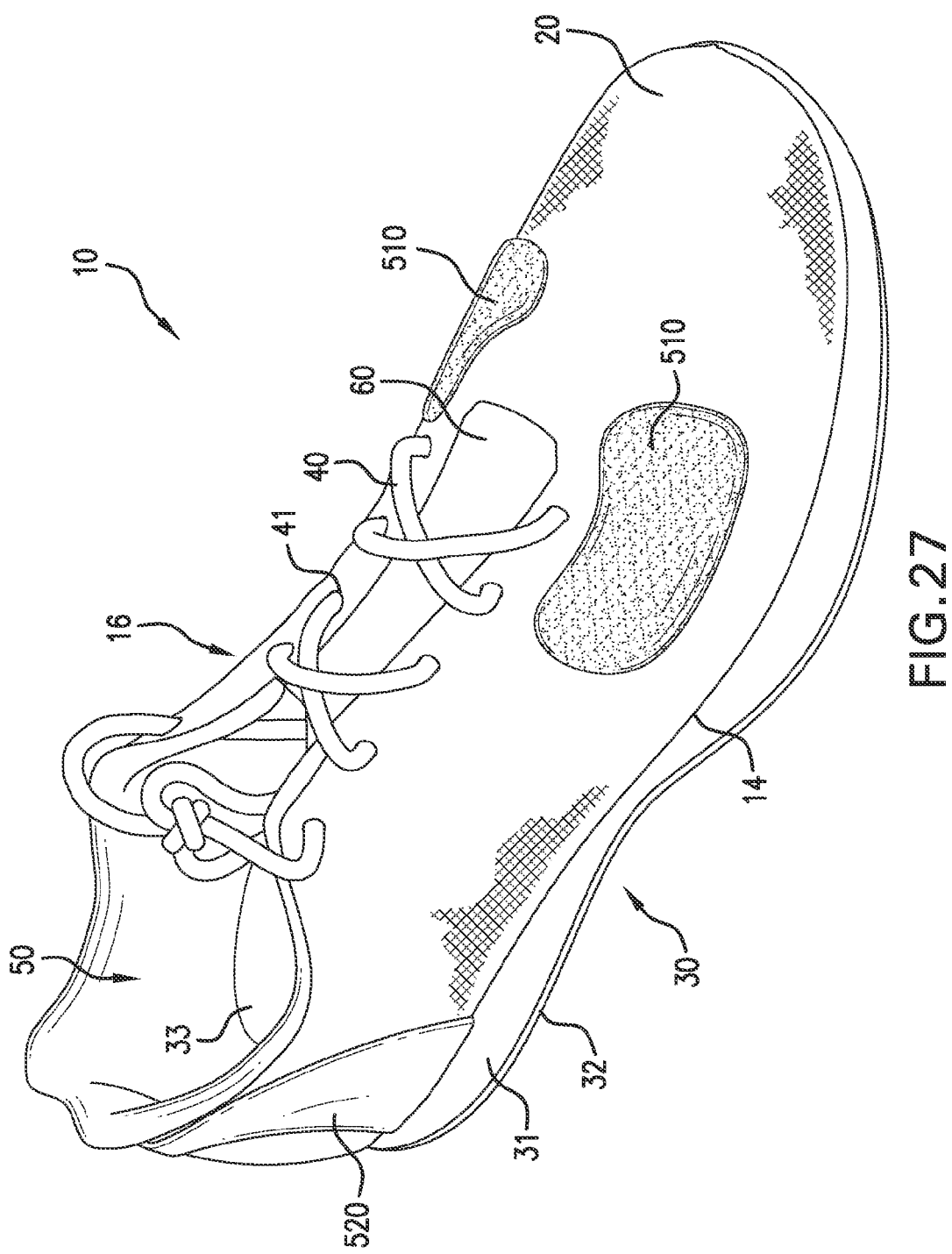
FIG. 27 shows an elevated view of an article of footwear assembled after printing of the 3D pattern shown in FIG. 26, consistent with an embodiment of the disclosure.
Figure 28:
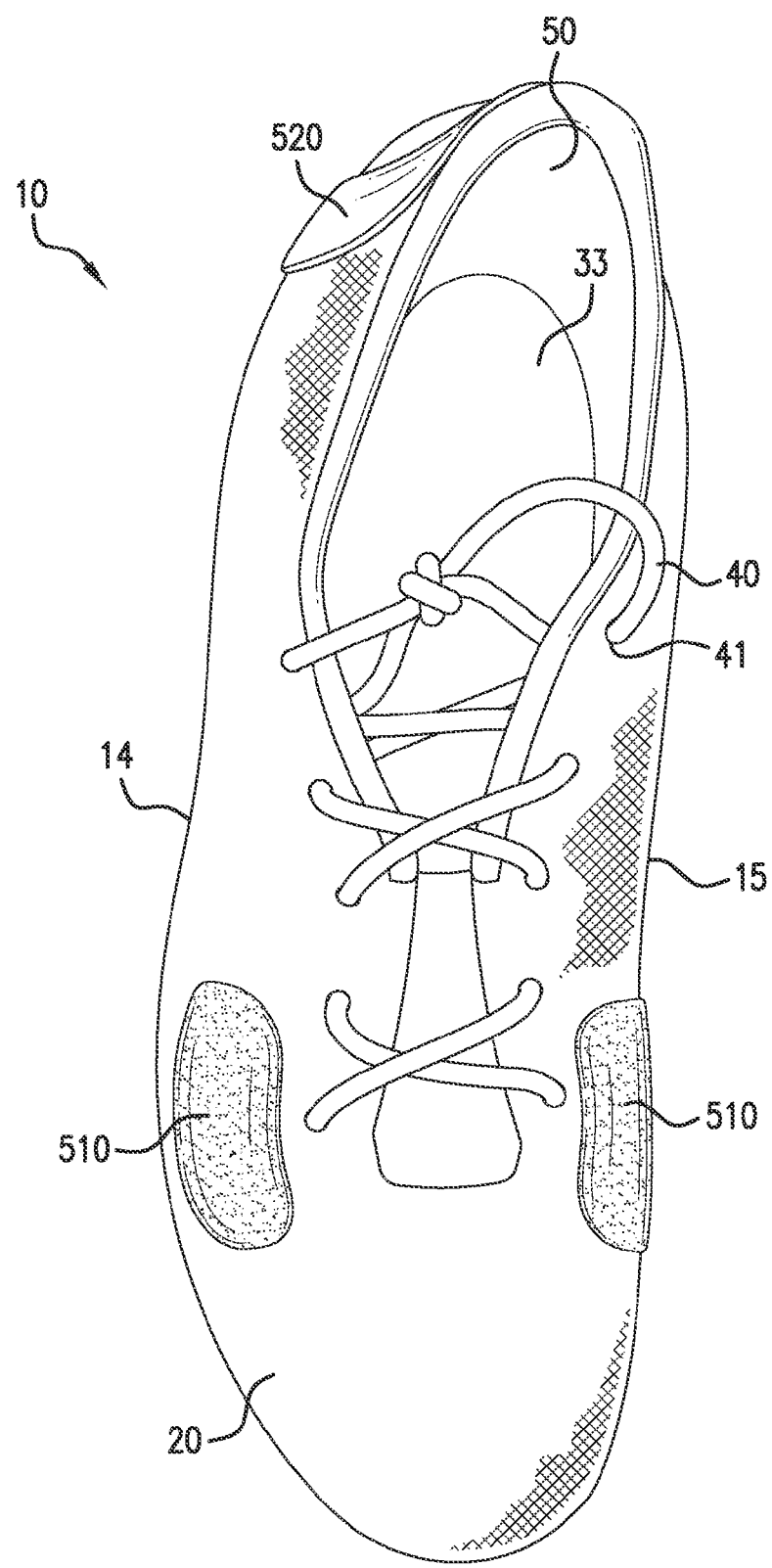
FIG. 28 shows an elevated view of a top portion of the article of footwear shown in FIG. 27, consistent with an embodiment of the disclosure.
Figure 29:
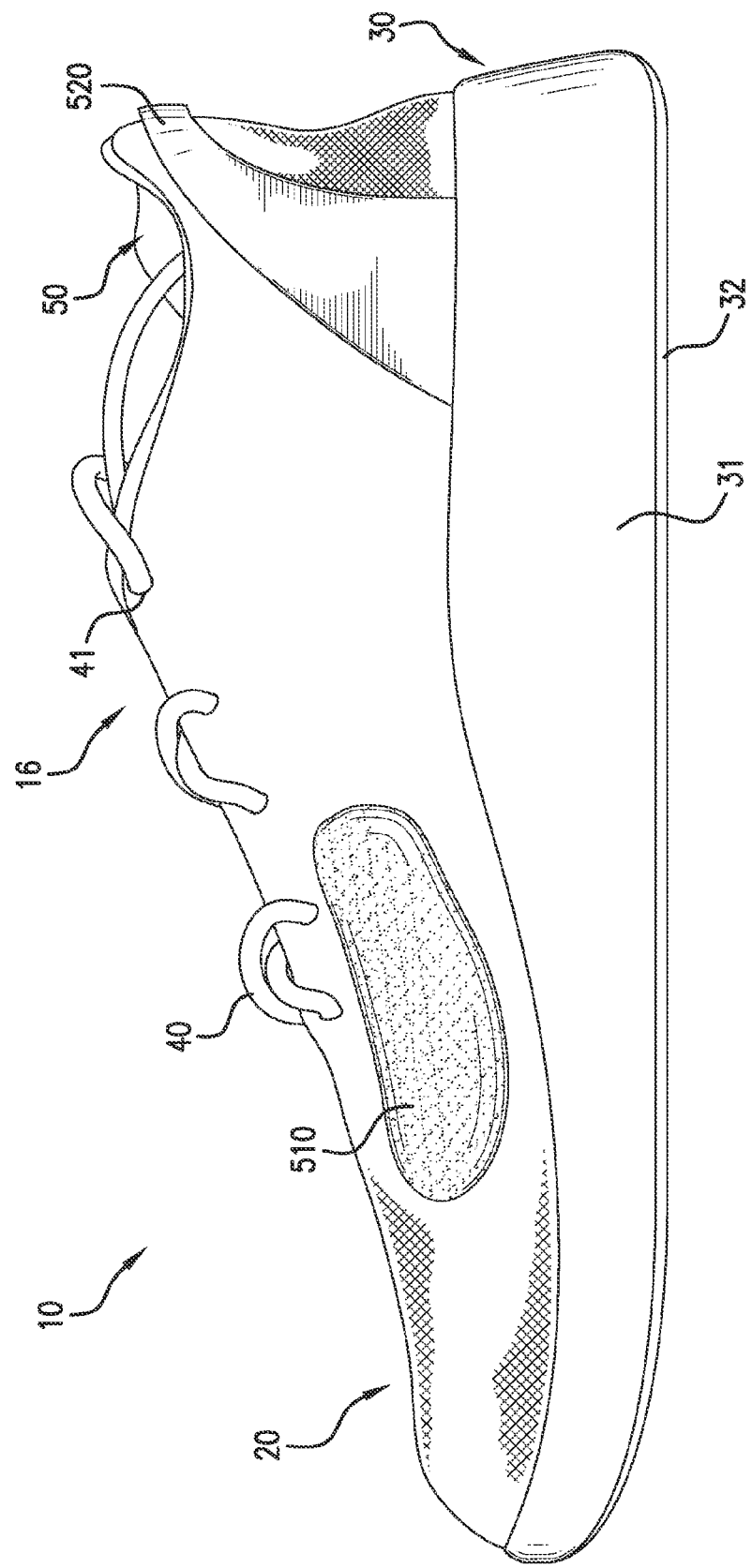
FIG. 29 shows an elevated view of a medial side of the article of footwear shown in FIG. 27, consistent with an embodiment of the disclosure.
Figure 30:
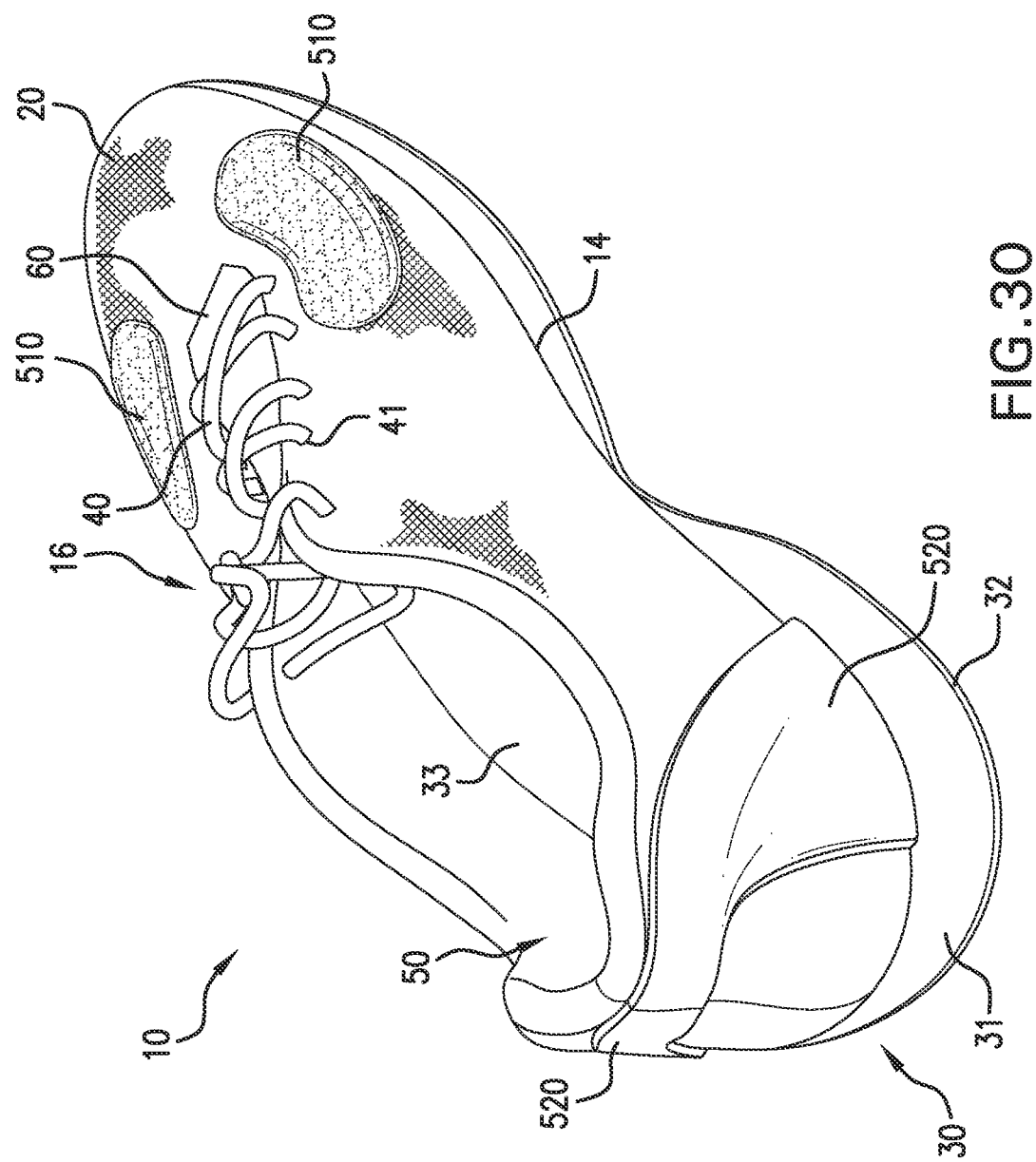
FIG. 30 shows an elevated view of a rear portion of the article of footwear shown in FIG. 27, consistent with an embodiment of the disclosure.

Consistent with an embodiment, FIG. 26 illustrates a perspective view of upper 20 after 3D printing of alternative patterns and prior to completion of footwear assembly, similar to FIGS. 7 and 24. FIG. 26 thus illustrates first printed material 510 and second printed material 520 on upper 20, printed using system 80 and process 400. For reference, exemplary printing directions XY and Z are shown in FIG. 26. Consistent with an embodiment, first printed material 510 and second printed material 520 may be different materials. For example, first printed material 510 may be a thin, abrasion-resistant material. Also, for example, second printed material 520 may be a thicker, stiff material designed to provide structural support to a portion of upper 20. First printed material 510 and second printed material 520 may be disposed on any desired portion or portions of upper 20.

First printed material 510 and second printed material 520 may be printed to upper 20 to impart customized properties such as increased strength, rigidity, support, flexibility, abrasion resistance, or variations thereof based on desired properties for specific portions of the upper and the article of footwear as a whole. For example, FIGS. 27-30 illustrate footwear 10 with first printed material 510 and second printed material 520 disposed on upper 20. Consistent with an embodiment, first printed material 510 and second printed material 520 may be formed by direct 3D printing and curing of material onto upper 20 in any desired pattern, shape, or coverage. Printing and curing of first printed material 510 and second printed material 520 may be performed in accordance with exemplary system 80 and exemplary process 400. Likewise, as discussed with respect to FIGS. 1-5, various portions of first printed material 510 and second printed material 520 may be interconnected, but may also not be interconnected. While first printed material 510 and second printed material 520 are generally shown in FIGS. 27-30 in forefoot and heel regions, respectively, of upper 20, one of ordinary skill in the art will recognize that first printed material 510 and second printed material 520, or one or more additional printed materials (not shown), may also be printed in the midfoot region or any other region of footwear 10. Consistent with an embodiment, first printed material 510 and second printed material 520 are adhered or otherwise bonded to upper 20, may be at least partially absorbed into a surface of upper 20, and may be formed in one or more contiguous or disjointed layers on upper 20. After printing, upper 20 may be shaped for assembly of footwear 10 similar to the depiction in FIG. 25.

As shown in the various views of footwear 10 in FIGS. 27-30, for example, footwear 10 may comprise first printed material 510 as one or more abrasion resistant pads located in either or both of forefoot region 11 and midfoot region 12, and may be useful for protecting footwear 10, for example, while engaging in soccer. Likewise, second printed material 520 may be a strengthening rigid material customized to provide strength and support to heel region 13 of footwear 10. Consistent with an embodiment, moreover, first printed material 510 may be thinner than second printed material 520. One of ordinary skill in the art will recognize that the thickness of first printed material 510 and second printed material 520 may differ or be the same, however, depending on the desired application or use of footwear 10.

One of ordinary skill in the art will recognize that printed materials consistent with an embodiment may have a structural aspect, a visual or aesthetic aspect, or both. For example, printed materials consistent with an embodiment may be a visual or decorative indicia, logo, graphic, or reflector in the midfoot region or any other regions of footwear 10. Likewise, for example, printed materials consistent with an embodiment may be a structural material, to impart strength, abrasion resistance, protection, or stiffness to one or more regions of footwear 10. Consistent with an embodiment, printed materials may have a first characteristic for a first portion of footwear 10, and a second, third, etc., or other additional characteristics for one or more additional regions of footwear 10.

Thus, for example, as shown in FIGS. 26-30 and generally in the other figures, and consistent with an embodiment, footwear 10 may be fabricated by designing at least a first three-dimensional pattern and a second three dimensional pattern (such as one or more CAD representations 89 shown in FIG. 6) for printing onto upper 20; providing the at least first and second three-dimensional patterns to print server 83; positioning at least a first portion of upper 20 on tray 90 in 3D printer device 81 of system 80, the first portion being positioned substantially flat on tray 90; aligning the first portion of upper 20 with the first pattern (as shown, for example, in FIG. 18); printing at least one layer of first printed material 510 having a first material property directly onto the first portion of upper 20 using the designed first pattern; allowing the at least one layer of first printed material 510 to at least partially absorb into a first portion of a surface of upper 20; curing the at least one layer of first printed material 510; positioning at least a second portion of upper 20 on tray 90, the second portion being positioned substantially flat on tray 90; aligning the second portion of the upper with the second pattern (as similarly shown, for example, in FIG. 18); printing at least one layer of second printed material 520 having a second material property directly onto the second portion of upper 20 using the designed second pattern; allowing the at least one layer of second printed material 520 to at least partially absorb into a second portion of the surface of upper 20; curing the at least one layer of second printed material 520; removing upper 20 from 3D printer device 81; and assembling footwear 10 using the printed upper and at least one footwear component chosen from sock liner 33, midsole 31, and outsole 32 (as similarly shown, for example, in FIGS. 5 and 25).

One of ordinary skill in the art will recognize that the systems and methods described throughout this disclosure can be used to 3D print any desired patterns, layers, or materials directly onto a fabric material, which allows building of a structure on the fabric for use in apparel applications.

While various embodiments have been described, the description is intended to be exemplary, rather than limiting, and it will be apparent to those of ordinary skill in the art that many more embodiments and implementations are possible that are within the scope of the disclosure. It is intended that all such additional systems, methods, features and advantages be included within this description and this summary, be within the scope of the disclosure, and be protected by the following claims.

What is claimed is:

1. A method of direct three-dimensional printing onto an article of footwear, comprising:
designing a three-dimensional pattern for printing onto the article of footwear;
positioning at least a portion of the article of footwear on a tray in a three-dimensional printing system, the at least a portion comprising a fabric and being positioned substantially flat on the tray to provide a fabric printing substrate;
printing a three-dimensional material directly onto the fabric of the at least a portion of the article of footwear using the three-dimensional pattern;
curing the three-dimensional material; and
removing the article of footwear from the three-dimensional printing system, wherein the fabric printing substrate is part of the article of footwear.

2. The method according to claim 1, wherein the at least a portion of the article of footwear comprises a side of an upper of the article of footwear,
wherein the printing onto the fabric of the side of the upper of the article of footwear comprises printing a plurality of loops onto the fabric of the side of the upper, and
wherein each loop of the plurality of loops extends upwardly from a lower portion of the side of the upper of the article of footwear and around a lace aperture to provide the upper with structural support.

3. The method according to claim 1, wherein the printing onto the fabric of the at least a portion of the article of footwear further comprises allowing the three-dimensional material to at least partially absorb into the fabric prior to the curing.

4. The method according to claim 1, wherein the printing onto the fabric of the at least a portion of the article of footwear further comprises:
printing a first layer of the three-dimensional material;
allowing the first layer of three-dimensional material to at least partially absorb into the fabric of the at least a portion of the article of footwear;
curing the first layer of three-dimensional material;
printing at least one additional layer of the three-dimensional material on the cured first layer; and
curing the at least one additional layer.

5. The method according to claim 4, wherein the first layer has a first modulus of elasticity and the at least one additional layer has a second modulus of elasticity different than the first modulus.

6. The method according to claim 4, wherein the first layer has a first color and the at least one additional layer has a second color.

7. The method according to claim 1, wherein the fabric of the at least a portion of the article of footwear comprises at least one of a textile, a natural fabric, a synthetic fabric, a knit, a woven material, a nonwoven material, a mesh, a leather, a synthetic leather, a polymer, a rubber, and a foam.

8. The method according to claim 1, wherein the fabric of the at least a portion of the article of footwear has at least one irregular surface having an irregular surface topology.

9. The method according to claim 8, wherein the at least one irregular surface is the fabric printing substrate on which the printing occurs, and
wherein printing the three-dimensional material comprises compensating for irregularities in the at least one irregular surface by at least one of adjusting a distance between a printhead and the at least one irregular surface and adjusting at least one of size, rate, and distribution of material ejected from the printhead.

10. The method according to claim 1, wherein the removing the article of footwear does not require a release layer disposed between the three-dimensional material and the tray.

11. The method according to claim 1, wherein the three-dimensional material comprises at least one of an ink, a resin, an acrylic, a polymer, a thermoplastic material, a thermosetting material, and a light-curable material.

12. The method according to claim 1, wherein the three-dimensional material further comprises a filler material.

13. The method according to claim 1, wherein the three-dimensional material is adhered or bonded to the fabric of the at least a portion of the article of footwear.

14. A method of fabricating an article of footwear, comprising:
designing a three-dimensional pattern for printing onto an upper;
providing the three-dimensional pattern to a print server;
positioning at least a portion of the upper on a tray in a three-dimensional printing system, the at least a portion comprising a fabric and being positioned substantially flat on the tray to provide a fabric printing substrate;
aligning the at least a portion of the upper on the tray with the three-dimensional pattern;
printing a three-dimensional material directly onto the fabric of the at least a portion of the upper using the three-dimensional pattern on the print server and the three-dimensional printing system;
curing the three-dimensional material;
removing the upper from the three-dimensional printing system, wherein the fabric printing substrate is part of the upper; and
assembling the article of footwear using the upper and at least one footwear component chosen from a sock liner, a midsole, and an outsole.

15. The method according to claim 14, wherein the at least a portion of the upper comprises a side of the upper,
wherein the printing onto the fabric of the side of the upper comprises printing a plurality of loops onto the fabric of the side of the upper, and
wherein each loop of the plurality of loops extends upwardly from a lower portion of the side of the upper and around a lace aperture to provide the upper with structural support.

16. The method according to claim 14, wherein the printing onto the fabric of the at least a portion of the upper further comprises allowing the three-dimensional material to at least partially absorb into the fabric prior to the curing.

17. The method according to claim 14, wherein the printing onto the fabric of the at least a portion of the upper further comprises:
printing a first layer of the three-dimensional material;
allowing the first layer of three-dimensional material to at least partially absorb into the fabric of the at least a portion of the upper;
curing the first layer of three-dimensional material;
printing at least one additional layer of the three-dimensional material on the cured first layer; and
curing the at least one additional layer.

18. The method according to claim 17, wherein the first layer has a first modulus of elasticity and the at least one additional layer has a second modulus of elasticity different than the first modulus.

19. The method according to claim 17, wherein the first layer has a first color and the at least one additional layer has a second color.

20. The method according to claim 14, wherein the fabric of the at least a portion of the upper comprises at least one of a textile, a natural fabric, a synthetic fabric, a knit, a woven material, a nonwoven material, a mesh, a leather, a synthetic leather, a polymer, a rubber, and a foam.

21. The method according to claim 14, wherein the fabric of the at least a portion of the upper has at least one irregular surface having an irregular surface topology.

22. The method according to claim 21, wherein the at least one irregular surface is the fabric printing substrate on which the printing occurs, and
wherein printing the three-dimensional material comprises compensating for irregularities in the at least one irregular surface by at least one of adjusting a distance between a printhead and the at least one irregular surface and adjusting at least one of size, rate, and distribution of material ejected from the printhead.

23. The method according to claim 14, wherein the removing the upper does not require a release layer disposed between the three-dimensional material and the tray.

24. The method according to claim 14, wherein the three-dimensional material comprises at least one of an ink, a resin, an acrylic, a polymer, a thermoplastic material, a thermosetting material, and a light-curable material.

25. The method according to claim 14, wherein the three-dimensional material further comprises a filler material.

26. The method according to claim 14, wherein the three-dimensional material is adhered or bonded to the fabric of the at least a portion of the upper.

27. A method of fabricating an article of footwear, comprising:
designing a three-dimensional pattern for printing onto an upper;
providing the three-dimensional pattern to a print server;
positioning a fabric portion of the upper on a tray in a three-dimensional printing system, the fabric portion being positioned substantially flat on the tray to provide a fabric printing substrate;
aligning the fabric portion of the upper on the tray with the three-dimensional pattern;
printing a first layer of three-dimensional material directly onto the fabric portion of the upper using the three-dimensional pattern on the print server and the three-dimensional printing system;
allowing the first layer of three-dimensional material to at least partially absorb into the fabric portion of the upper;
curing the first layer,
wherein the cured first layer has a first modulus of elasticity;
printing at least one additional layer of the three-dimensional material on the cured first layer;
curing the at least one additional layer,
wherein the cured at least one additional layer has a different modulus of elasticity than the first modulus;
removing the upper from the three-dimensional printing system, wherein the fabric printing substrate is part of the upper; and
assembling the article of footwear using the upper and at least one footwear component chosen from a sock liner, a midsole, and an outsole.

28. The method according to claim 27, wherein the printing the first layer further comprises printing the three-dimensional material having a gradient in modulus of elasticity within at least a region of the three-dimensional material.

29. The method according to claim 28, wherein the printing the at least one additional layer further comprises printing multiple layers having varied moduli of elasticity as a function of depth or length of the three-dimensional material.

30. The method according to claim 27, wherein the fabric portion of the upper comprises at least one of a textile, a natural fabric, a synthetic fabric, a knit, a woven material, a nonwoven material, a mesh, a leather, a synthetic leather, a polymer, a rubber, and a foam.

31. The method according to claim 27, wherein the fabric portion of the upper has at least one irregular surface having an irregular surface topology.

32. The method according to claim 31, wherein the at least one irregular surface is the fabric printing substrate on which the printing occurs, and
wherein printing the three-dimensional material comprises compensating for irregularities in the at least one irregular surface by at least one of adjusting a distance between a printhead and the at least one irregular surface and adjusting at least one of size, rate, and distribution of material ejected from the printhead.

33. The method according to claim 27, wherein the removing the upper does not require a release layer disposed between the three-dimensional material and the tray.

34. The method according to claim 27, wherein the three-dimensional material comprises at least one of an ink, a resin, an acrylic, a polymer, a thermoplastic material, a thermosetting material, and a light-curable material.

35. The method according to claim 27, wherein the three-dimensional material further comprises a filler material.

36. The method according to claim 27, wherein the three-dimensional material is adhered or bonded to the fabric portion of the upper.

37. A method of fabricating an article of footwear, comprising:
designing at least a first three-dimensional pattern and a second three-dimensional pattern for printing onto an upper;
providing the at least first and second three-dimensional patterns to a print server;
positioning at least a first fabric portion of the upper on a tray in a three-dimensional printing system, the first fabric portion being positioned substantially flat on the tray to provide a first fabric printing substrate;
aligning the first fabric portion of the upper with the first three-dimensional pattern;
printing at least one layer of a first three-dimensional material having a first material property directly onto the first fabric portion of the upper using the first three-dimensional pattern;
allowing the at least one layer of first three-dimensional material to at least partially absorb into the first fabric portion of the upper;
curing the at least one layer of first three-dimensional material;
positioning at least a second fabric portion of the upper on the tray, the second fabric portion being positioned substantially flat on the tray to provide a second fabric printing substrate;
aligning the second fabric portion of the upper with the second three-dimensional pattern;
printing at least one layer of a second three-dimensional material having a second material property directly onto the second fabric portion of the upper using the second three-dimensional pattern;
allowing the at least one layer of second three-dimensional material to at least partially absorb into the second fabric portion of the upper;
curing the at least one layer of second three-dimensional material;
removing the upper from the three-dimensional printing system, wherein the first and second fabric printing substrates are part of the upper; and
assembling the article of footwear using the upper and at least one footwear component chosen from a sock liner, a midsole, and an outsole.

38. The method according to claim 9, wherein the irregular surface comprises at least one of a knit and a weave of the fabric of the at least a portion of the article of footwear.

39. The method according to claim 14, wherein the at least a portion of the upper comprises a forefoot region of the upper, and
wherein the printing onto the fabric of the forefoot region of the upper comprises:
printing a first strip extending from a medial side of the forefoot region to a lateral side of the forefoot region, and
printing a second strip extending from the medial side of the forefoot region to the lateral side of the forefoot region and intersecting the first strip,
such that the first strip and the second strip provide the upper with structural support.

40. The method according to claim 1, wherein the three-dimensional material is selected from the group consisting of an ink, a resin, an acrylic, a polymer, a thermoplastic material, a thermosetting material, and a light-curable material.

41. The method according to claim 14, wherein the three-dimensional material is selected from the group consisting of an ink, a resin, an acrylic, a polymer, a thermoplastic material, a thermosetting material, and a light-curable material.

42. The method according to claim 27, wherein the three-dimensional material is selected from the group consisting of an ink, a resin, an acrylic, a polymer, a thermoplastic material, a thermosetting material, and a light-curable material.

\* \* \* \* \*